US012679257B2

(12) United States Patent
Williams

(10) Patent No.: US 12,679,257 B2
(45) Date of Patent: Jul. 14, 2026

(54) INFANT CAR SEAT ANCHORING ASSEMBLY WITH RETRACTABLE FOOT

(71) Applicant: Wonderland Switzerland AG, Steinhausen (CH)

(72) Inventor: Bruce L. Williams, Narvon, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 383 days.

(21) Appl. No.: 18/262,681

(22) PCT Filed: Jan. 24, 2022

(86) PCT No.: PCT/US2022/013472
§ 371 (c)(1),
(2) Date: Jul. 24, 2023

(87) PCT Pub. No.: WO2022/159797
PCT Pub. Date: Jul. 28, 2022

(65) Prior Publication Data
US 2024/0092236 A1     Mar. 21, 2024

Related U.S. Application Data

(60) Provisional application No. 63/193,969, filed on May 27, 2021, provisional application No. 63/141,061, filed on Jan. 25, 2021.

(51) Int. Cl.
*B60N 2/28*          (2006.01)

(52) U.S. Cl.
CPC ......... *B60N 2/2887* (2013.01); *B60N 2/2827* (2013.01); *B60N 2/2845* (2013.01); *B60N 2/2863* (2013.01)

(58) Field of Classification Search
CPC .. B60N 2/2887; B60N 2/2824; B60N 2/2827; B60N 2/2842; B60N 2/2848; B60N 2/2875; B60N 2/2878
See application file for complete search history.

(56) References Cited

U.S. PATENT DOCUMENTS

| | | | |
|---|---|---|---|
| 4,597,359 | A | 7/1986 | Moorman |
| 4,634,177 | A | 1/1987 | Meeker |

(Continued)

FOREIGN PATENT DOCUMENTS

| | | |
|---|---|---|
| CN | 2832620 Y | 11/2006 |
| CN | 201018820 Y | 2/2008 |

(Continued)

OTHER PUBLICATIONS

European Application No. 20852328.2 filed Mar. 3, 2022; European Search Report dated Aug. 3, 2023; 8 pages.

(Continued)

*Primary Examiner* — Syed A Islam
(74) *Attorney, Agent, or Firm* — CANTOR COLBURN LLP

(57) ABSTRACT

In one example, an infant car seat has a car seat body, a first anchor, a second anchor, and a foot. The car seat body defines a seating surface. Each of the first and second anchors releasably locks to an anchor of a vehicle seat, is coupled to the car seat body, and is configured to move relative to the car seat body between a retracted position and an extended position. The foot is coupled to the car seat body such that movement of one or both of the first and second anchors between the retracted position and the extended position causes the foot to move relative to 1) the car seat body and 2) one or both of the first and second anchors between a stowed position and a deployed position, where the foot is positioned to engage a seat pan of the vehicle seat in the deployed position.

9 Claims, 20 Drawing Sheets

(56) References Cited

U.S. PATENT DOCUMENTS

| | | | |
|---|---|---|---|
| 4,679,804 A * | 7/1987 | Johnson | B60N 2/2848 |
| | | | 280/30 |
| 5,277,148 A | 1/1994 | Rossignol et al. | |
| 5,487,588 A | 1/1996 | Burleigh et al. | |
| 5,536,066 A | 7/1996 | Sedlack | |
| 5,540,365 A | 7/1996 | Lamair | |
| 5,961,180 A | 10/1999 | Greger et al. | |
| 5,971,479 A | 10/1999 | Jacquemot et al. | |
| 6,058,529 A | 5/2000 | Goysich | |
| 6,209,957 B1 | 4/2001 | Baloga et al. | |
| 6,375,260 B1 | 4/2002 | Hiramatsu et al. | |
| 6,425,632 B1 | 7/2002 | Anthony et al. | |
| 6,428,099 B1 | 8/2002 | Kain | |
| 6,478,376 B2 | 11/2002 | Hayashi et al. | |
| 6,543,846 B2 | 4/2003 | Cone | |
| 6,592,183 B2 | 7/2003 | Kain | |
| 6,715,828 B1 | 4/2004 | Cheng | |
| 6,779,842 B2 | 8/2004 | Mcneff | |
| 6,899,057 B1 | 5/2005 | Chrisco et al. | |
| 7,066,536 B2 | 6/2006 | Williams et al. | |
| 7,083,228 B1 | 8/2006 | Al Sawan | |
| 7,159,948 B1 | 1/2007 | Wolf | |
| 7,168,762 B2 | 1/2007 | Maciejczyk | |
| 7,322,648 B2 | 1/2008 | Nakagawa et al. | |
| 7,488,034 B2 | 2/2009 | Ohren et al. | |
| 8,123,295 B2 | 2/2012 | Hutchinson et al. | |
| 8,141,950 B2 | 3/2012 | Boyer | |
| 8,282,165 B2 | 10/2012 | Kespohl | |
| 8,444,222 B2 | 5/2013 | Buckingham et al. | |
| 8,596,718 B2 | 12/2013 | Gaudreau, Jr. et al. | |
| 8,646,158 B2 | 2/2014 | Buckingham | |
| 8,926,014 B2 | 1/2015 | Su | |
| 9,004,593 B2 | 4/2015 | Banghart et al. | |
| 9,010,857 B2 | 4/2015 | Chen | |
| 9,102,249 B2 * | 8/2015 | Mo | B60N 2/269 |
| 9,150,126 B1 | 10/2015 | Kitchens et al. | |
| 9,221,368 B2 | 12/2015 | Hou et al. | |
| 9,452,695 B2 | 9/2016 | Sedlack | |
| 9,616,782 B2 | 4/2017 | Cohen et al. | |
| 10,266,078 B2 | 4/2019 | Mason et al. | |
| 10,299,609 B2 | 5/2019 | Taylor et al. | |
| 10,589,644 B2 | 3/2020 | Henseler et al. | |
| 10,772,288 B1 | 9/2020 | Sandiford | |
| 11,338,710 B2 | 5/2022 | Zhang | |
| 11,618,353 B2 | 4/2023 | Mason et al. | |
| 12,252,045 B2 | 3/2025 | Mason et al. | |
| 2003/0151282 A1 | 8/2003 | Williams et al. | |
| 2005/0062321 A1 | 3/2005 | Maier et al. | |
| 2006/0213452 A1 | 9/2006 | King | |
| 2007/0246976 A1 | 10/2007 | Jane | |
| 2008/0290708 A1 | 11/2008 | Pos | |
| 2009/0273215 A1 | 11/2009 | Barker et al. | |
| 2010/0033001 A1 | 2/2010 | Boyer | |
| 2010/0086236 A1 | 4/2010 | Lapstun | |
| 2010/0126427 A1 | 5/2010 | Mcgrade | |
| 2010/0288204 A1 | 11/2010 | Costello et al. | |
| 2011/0197823 A1 | 8/2011 | Pietra | |
| 2012/0261958 A1 | 10/2012 | Hutchinson et al. | |
| 2013/0099535 A1 | 4/2013 | Su | |
| 2013/0200672 A1 | 8/2013 | Mo | |
| 2013/0328369 A1 | 12/2013 | Mo | |
| 2014/0062151 A1 | 3/2014 | Banghart et al. | |
| 2014/0307310 A1 | 10/2014 | Steiner et al. | |
| 2016/0057968 A1 | 3/2016 | Chandler | |
| 2016/0059744 A1 | 3/2016 | Cohen et al. | |
| 2018/0086236 A1 | 3/2018 | Henseler et al. | |
| 2018/0236900 A1 | 8/2018 | Nieto et al. | |
| 2018/0251051 A1 | 9/2018 | Anderson et al. | |
| 2019/0084449 A1 | 3/2019 | Cohen et al. | |
| 2019/0092193 A1 | 3/2019 | Houin | |
| 2019/0275949 A1 | 9/2019 | Kubota | |
| 2019/0320613 A1 | 10/2019 | Björnetun | |
| 2019/0343068 A1 | 11/2019 | Depaulis | |
| 2020/0296919 A1 | 9/2020 | Jakubowski et al. | |
| 2020/0331510 A1 | 10/2020 | Kim | |

| | | |
|---|---|---|
| 2021/0084864 A1 | 3/2021 | Torres et al. |
| 2021/0127627 A1 | 5/2021 | Jakubowski et al. |
| 2021/0259199 A1 | 8/2021 | Lin et al. |
| 2021/0362765 A1 | 11/2021 | Fan et al. |
| 2021/0380155 A1 | 12/2021 | Ma et al. |
| 2022/0194271 A1 | 6/2022 | Mason et al. |
| 2022/0227330 A1 | 7/2022 | Klugo |
| 2022/0250513 A1 | 8/2022 | Mason et al. |
| 2022/0295739 A1 | 9/2022 | Yoskowitz |
| 2023/0242017 A1 | 8/2023 | Mason et al. |
| 2023/0311723 A1 | 10/2023 | Mason et al. |
| 2025/0031662 A1 | 1/2025 | Guo et al. |
| 2025/0089674 A1 | 3/2025 | Guo et al. |
| 2025/0187505 A1 | 6/2025 | Mason et al. |
| 2025/0194557 A1 | 6/2025 | Guo et al. |
| 2026/0021754 A1 | 1/2026 | Mason et al. |

FOREIGN PATENT DOCUMENTS

| | | | |
|---|---|---|---|
| CN | 201022544 Y | 2/2008 | |
| CN | 101386275 A | 3/2009 | |
| CN | 201573566 U | 9/2010 | |
| CN | 201587342 U | 9/2010 | |
| CN | 102336154 A | 2/2012 | |
| CN | 202127690 U | 2/2012 | |
| CN | 102427965 A | 4/2012 | |
| CN | 102848940 A | 1/2013 | |
| CN | 102343842 B | 4/2013 | |
| CN | 103568891 A | 2/2014 | |
| CN | 103770828 B | 1/2016 | |
| CN | 106135022 A | 11/2016 | |
| CN | 106218459 A | 12/2016 | |
| CN | 106240525 A | 12/2016 | |
| CN | 106394337 A | 2/2017 | |
| CN | 107089172 A | 8/2017 | |
| CN | 107410083 A | 12/2017 | |
| CN | 107637531 A | 1/2018 | |
| CN | 108045425 A | 5/2018 | |
| CN | 108099704 A | 6/2018 | |
| CN | 108433443 A | 8/2018 | |
| CN | 108528290 A | 9/2018 | |
| CN | 108688527 A | 10/2018 | |
| CN | 108790973 A | 11/2018 | |
| CN | 109305074 A | 2/2019 | |
| CN | 110091774 A | 8/2019 | |
| CN | 209284725 U | 8/2019 | |
| CN | 209498187 U | 10/2019 | |
| CN | 209861910 U | 12/2019 | |
| CN | 110775133 A | 2/2020 | |
| CN | 110979441 A | 4/2020 | |
| CN | 212212287 U | 12/2020 | |
| CN | 212685696 U | 3/2021 | |
| CN | 212890543 U | 4/2021 | |
| CN | 213138903 U | 5/2021 | |
| CN | 109843643 B | 6/2021 | |
| CN | 213974155 U | 8/2021 | |
| CN | 113665659 A | 11/2021 | |
| CN | 113665660 A | 11/2021 | |
| CN | 214593477 U | 11/2021 | |
| CN | 113734265 A | 12/2021 | |
| CN | 215012471 U | 12/2021 | |
| CN | 114364571 A | 4/2022 | |
| CN | 216533131 U | 5/2022 | |
| CN | 114641409 A | 6/2022 | |
| CN | 218851568 U | 4/2023 | |
| CN | 108739438 B | 9/2023 | |
| CN | 117207866 A | 12/2023 | |
| EA | 038452 B1 | 8/2021 | |
| EP | 0693393 A1 | 1/1996 | |
| EP | 0970842 B1 | 9/2004 | |
| EP | 3378697 A1 | 9/2018 | |
| EP | 3453563 A1 | 3/2019 | |
| EP | 4010223 A4 | 9/2023 | |
| FR | 2736609 A1 | 1/1997 | |
| FR | 2789642 A1 | 8/2000 | |
| FR | 2914602 A1 | 10/2008 | |
| GB | 753337 A | 7/1956 | |
| GB | 2326101 A | 12/1998 | |
| GB | 2501178 A | 10/2013 | |

(56)          References Cited

FOREIGN PATENT DOCUMENTS

| | | | |
|---|---|---|---|
| GB | 2549526 | A | 10/2017 |
| GB | 2597331 | A | 1/2022 |
| JP | H06344817 | A | 12/1994 |
| JP | 2505602 | Y | 5/1996 |
| JP | H08301124 | A | 11/1996 |
| JP | 2001105941 | A | 4/2001 |
| JP | 2001171404 | A | 6/2001 |
| JP | 2001354143 | A | 12/2001 |
| JP | 2002052963 | A | 2/2002 |
| JP | 2005245388 | A | 9/2005 |
| JP | 2006151299 | A | 6/2006 |
| JP | 3127413 | U | 11/2006 |
| JP | 3130171 | U | 2/2007 |
| JP | 2007022128 | A | 2/2007 |
| JP | 2007168581 | A | 7/2007 |
| JP | 2007238080 | A | 9/2007 |
| JP | 2010519094 | A | 6/2010 |
| JP | 2010263890 | A | 11/2010 |
| JP | 2012148641 | A | 8/2012 |
| JP | 2013516352 | A | 5/2013 |
| JP | 2013106557 | A | 6/2013 |
| JP | 2013159339 | A | 8/2013 |
| JP | 2016512482 | A | 4/2016 |
| JP | 2017074849 | A | 4/2017 |
| JP | 2017205081 | A | 11/2017 |
| JP | 3218427 | U | 9/2018 |
| JP | 2018144805 | A | 9/2018 |
| JP | 2019181069 | A | 10/2019 |
| JP | 2020189585 | A | 11/2020 |
| JP | 3237650 | U | 5/2022 |
| JP | 3239477 | U | 10/2022 |
| JP | 2023522684 | A | 5/2023 |
| JP | 2024052885 | A | 4/2024 |
| KR | 20060010115 | A | 2/2006 |
| KR | 20140052277 | A | 5/2014 |
| KR | 20180101270 | A | 9/2018 |
| KR | 20210096845 | A | 8/2021 |
| KR | 20220049822 | A | 4/2022 |
| KR | 20220087355 | A | 6/2022 |
| KR | 102436990 | B1 | 8/2022 |
| RU | 2755840 | C2 | 9/2021 |
| TW | 200916350 | A | 4/2009 |
| TW | I645776 | B | 1/2019 |
| TW | I728113 | B | 5/2021 |
| TW | 202229047 | A | 8/2022 |
| TW | 202233101 | A | 9/2022 |
| WO | 2005108155 | A2 | 11/2005 |
| WO | 2014071987 | A1 | 5/2014 |
| WO | 2016183156 | A1 | 11/2016 |
| WO | 2019054652 | A1 | 3/2019 |
| WO | 2021030243 | A1 | 2/2021 |
| WO | 2021229051 | A1 | 11/2021 |
| WO | 2022160403 | A1 | 8/2022 |
| WO | 2023234870 | A2 | 12/2023 |
| WO | 2024010527 | A2 | 1/2024 |
| WO | 2024054158 | A1 | 3/2024 |
| WO | 2024054160 | A1 | 3/2024 |
| WO | 2024155240 | A1 | 7/2024 |
| WO | 2024172762 | A1 | 8/2024 |

OTHER PUBLICATIONS

International Preliminary Report on Patentability; International Application No. PCT/US2022/013472; International Filing Date: Jan. 24, 2022; Date of Mailing: Aug. 3, 2023; 10 pages.
Advisory Action; U.S. Appl. No. 17/609,590, filed Nov. 8, 2021; Kyle S. Mason; Date Mailed: Apr. 2, 2024; pp. 1-5.
US Final Office Action; U.S. Appl. No. 18/332,217, filed: Jun. 9, 2023; Kyle S. Mason; Date Mailed: Jan. 26, 2024; pp. 1-15.
U.S. Non-Final Office Action, U.S. Appl. No. 18/295,529, mailed Feb. 12, 2026, 24 pages.
European Application No. 22743312.5-1009; Extended European Search Report dated Jul. 3, 2024; 8 pages.

Japanese Patent Application No. 2022-506432; Notice of Reasons for Refusal with English translation dated Jul. 30, 2024; 10 pages.
International Search Report for International Application No. PCT/US2024/012746; International Filing Date: Jan. 24, 2024; Date of Mailing: Jun. 27, 2024; 5 pages.
Written Opinion for International Application No. PCT/US2024/012746; International Filing Date: Jan. 24, 2024; Date of Mailing: Jun. 27, 2024; 29 pages.
International Search Report for International Application No. PCT/US2024/014768; International Filing Date: Feb. 7, 2024; Date of Mailing: Jul. 18, 2024; 4 pages.
Written Opinion for International Application No. PCT/US2024/014768; International Filing Date: Feb. 7, 2024; Date of Mailing: Jul. 18, 2024; 8 pages.
Japanese Patent Application No. 2023-129410; Office Action with English translation dated Sep. 3, 2024; 14 pages.
Taiwan Office Action, Application No. 111102381, mailed Feb. 3, 2026, with English Translation, 8 pages.
Non-Final Office Action for U.S. Appl. No. 18/332,217; Application Filing Date: Jun. 9, 2023; Date of Notification: Oct. 25, 2023, 25 pages.
AU Office Action; Exaination Report; Appl No. 2020329161; issued May 6, 2025; pp. 1-3.
EP Communication; Extended European Search Report; Application No. 23863590.8; Date Mailed: Apr. 22, 2025; pp. 1-9.
JP 1st Office Action with English Translation; JP Appl No. 2024-548482; Date Mailed Jul. 29, 2025; pp. 1-8.
JP Search Report with English Translation; JP Appl No. 2024-548482; Date Mailed Jun. 30, 2025; pp. 1-47.
RU OA; Application No. 2023121336 issued May 26, 2025; pp. 1-11, with English Translation.
TW OA; Application No. 111102381 issued Jun. 6, 2025; pp. 1-12, with English Translation.
Written Opinion, Singapore Application No. 11202112184P, filed Oct. 8, 2020; mailed Aug. 8, 2025; 7 pages.
Chinese Application No. 2024202872653; 1st Office Action with English translation dated Oct. 12, 2024; 3 pages.
European Application No. 24202026.1; European Search Report dated Dec. 19, 2024; 9 pages.
European Application No. 24202026.1; Extended European Search Report dated Dec. 19, 2024; 9 pages.
European Application No. 24203319.9; Extended European Search Report dated Jan. 9, 2025; 9 pages.
International Search Report & Written Opinion for International Application No. PCT/SG2024/050617; International Filing Date: Sep. 24, 2024; Date of Mailing: Dec. 20, 2024; 39 pages.
International Search Report with English translation for International Application No. PCT/SG2023/050398; International Filing Date: Jun. 1, 2023; Date of Mailing: Nov. 23, 2023; 11 pages.
International Search Report with English translation for International Application No. PCT/SG2023/050474; International Filing Date: Jul. 6, 2023; Date of Mailing: Dec. 7, 2023; 11 pages.
International Search Report with English translation for International Application No. PCT/SG2023/050611; International Filing Date: Sep. 8, 2023; Date of Mailing: Jan. 26, 2024; 11 pages.
International Search Report with English translation for International Application No. PCT/SG2024/050040; International Filing Date: Jan. 18, 2024; Date of Mailing: Apr. 24, 2024; 11 pages.
International Search Report with English translation for International Application No. PCT/SG2024/050065; International Filing Date: Feb. 7, 2024; Date of Mailing: May 24, 2024; 7 pages.
International Search Report with English translation for International Application No. PCT/SG2024/050385; International Filing Date: Jun. 7, 2024; Date of Mailing: Sep. 12, 2024; 8 pages.
International Search Report with English translation for International Application No. PCT/SG2023/050609; International Filing Date: Sep. 8, 2023; Date of Mailing: Jan. 22, 2024; 13 pages.
Japanese Patent Application No. 2022-506432; Office Action dated Mar. 11, 2025; 3 pages.
Japanese Patent Application No. 2023-129410; Office Action dated Apr. 1, 2025; 5 pages.
Korean Application No. 10-2022-7000641; Office Action dated Feb. 24, 2025; 83 pages.

(56)          References Cited

OTHER PUBLICATIONS

Korean Patent Application No. 10-2023-7027324; Office Action dated Mar. 28, 2025; 92 pages.
Taiwanese Application No. 112120774; First Office Action dated Jan. 10, 2024; 19 pages.
Taiwanese Application No. 112125296; First Office Action dated May 28, 2024; 16 pages.
Taiwanese Application No. 112134349; First Office Action dated Aug. 23, 2024; 12 pages.
Taiwanese Application No. 112134349; Office Action with English translation dated Aug. 23, 2024; 34 pages.
Taiwanese Application No. 112134409; Office Action dated Dec. 9, 2024; 25 pages.
Taiwanese Application No. 113102129; Office Action dated Oct. 9, 2024; 28 pages.
Taiwanese Application No. 113104670; 1st Office Action dated Sep. 23, 2024; 37 pages.
Taiwanese Application No. 113120902; Office Action dated Jan. 13, 2025; 22 pages.
Taiwanese Application No. 113121067; Office Action with English translation dated Feb. 25, 2025; 9 pages.
U.S. Appl. No. 18/295,529; Non-Final Office Action dated Feb. 20, 2025; 60 pages.
Written Opinion for International Application No. PCT/SG2023/050398; International Filing Date: Jun. 1, 2023; Date of Mailing: Nov. 23, 2023; 7 pages.
Written Opinion for International Application No. PCT/SG2023/050474; International Filing Date: Jul. 6, 2023; Date of Mailing: Dec. 7, 2023; 8 pages.
Written Opinion for International Application No. PCT/SG2023/050611; International Filing Date: Sep. 8, 2023; Date of Mailing: Jan. 26, 2024; 11 pages.
Written Opinion for International Application No. PCT/SG2024/050040; International Filing Date: Jan. 18, 2024; Date of Mailing: Apr. 24, 2024; 8 pages.
Written Opinion for International Application No. PCT/SG2024/050065; International Filing Date: Feb. 7, 2024; Date of Mailing: May 24, 2024; 6 pages.
Written Opinion for International Application No. PCT/SG2023/050609; International Filing Date: Sep. 8, 2023; Date of Mailing: Jan. 22, 2024; 10 pages.
AU Examination Report No 1; Appl No. 2023280730; Date Mailed: Sep. 18, 2025; pp. 1-8.
JP Notice of Allowance with English Translation; Appl No. 2024-161628; Date Mailed: Nov. 4, 2025; pp. 1-5.
JP Office Action with English Translation; JP Appl No. 2024-570596; Date Mailed: Oct. 14, 2025; pp. 1-8.
JP Office Action with English Translation; Jp Appl No. 2024-171996; Mail Date: Oct. 21, 2025; pp. 1-8.
JP Search Report with English Translation; Appl No. 2024-171996; Date Mailed:Sep. 12, 2025; pp. 1-58.
JP Search Report with English Translation; JP Appl No. 2024-570596; Date Mailed: Oct. 10, 2025; pp. 1-42.
SureLoc Pet Carriers Using The Same Technology As Children's Safety Seats [viewed on internet on Sep. 17, 2025]<URL: https://www.youtube.com/watch?v=PpHBCcHrNDM >, published on Jun. 9, 2020; pp. 1-4.

Non-Final Office Action for U.S. Appl. No. 17/609,590; Application Filing Date: Nov. 8, 2021; Date of Notification: Oct. 4, 2023, pp. 1-33.
Extended European Search Report Communication; Application No. 23191952.3-1012/4253141; Date Mailed: Dec. 7, 2023; pp. 1-7.
Non-Final Office Action for U.S. Appl. No. 17/609,590; Application Filing Date: Nov. 8, 2021; Date of Notification: May 6, 2024, pp. 1-14.
Invitation to Pay Additional Fees; International Application No. PCT/US2024/012746; International Filing Date: Jan. 24, 2024; Date of Mailing: Apr. 23, 2024; 3 pages.
Invitation to Pay Additional Fees; International Application No. PCT/US2024/014768; International Filing Date: Feb. 7, 2024; Date of Mailing: Apr. 23, 2024; 2 pages.
Chinese Application No. 202021649884.0 filed Aug. 10, 2020; Notice of Allowance dated Nov. 3, 2021; 2 pages.
Chinese Application No. 202220219392.0 filed Jan. 25, 2022; Notice of Allowance dated Jun. 30, 2022; 4 pages.
Coroflot.com [online]; retrieved on Oct. 4, 2021; retrieved from the internet Product Design by Paul Morgado at Coroflot.com, "Simplicity Infant Car Seat," Coroflot.com, 11/12, Oct. 4, 2021; pp. 1-1https://www.coroflot.com/pmorgado/Product-Design.
European Application No. 20852328.2 filed Aug. 10, 2020; EPO Communication pursuant to Rules 161 and 162 EPC dated Mar. 16, 2022; 3 pages.
Final Office Action for U.S. Appl. No. 17/669,838; Application Filing Date: Feb. 11, 2022; Date of Notification: Nov. 8, 2022, 09 pages.
German Application No. 212020000696 filed Aug. 10, 2020; German Office Action dated Mar. 14, 2022; 2 pages.
German Application No. 212020000696 filed Aug. 10, 2020; German Office Action dated May 18, 2022; 1 page.
German Application No. 212020000696 filed Aug. 10, 2020; German Office Action dated Jul. 4, 2022; 1 page.
ISOFIX—Wikipedia, retrieved Dec. 7, 2022 from: https://en.wikipedia.org/w/index.php?title+isofix&oldid+884783492, 3 pages.
Non-Final Office Action for U.S. Appl. No. 17/669,838; Application Filing Date: Feb. 11, 2022; Date of Notification: Jul. 28, 2022, 19 pages.
PCT International Search Report ISR; International Application No. PCT/US2020/045576; International Filing Date: Aug. 10, 2020; Date of Mailing: Oct. 22, 2020; pp. 1-3.
PCT ISR—Written Opinion of the International Searching Authority; International Application No. PCT/US2020/045576; International Filing Date: Aug. 10, 2020; Date of Mailing: Oct. 22, 2020; pp. 1-26.
PCT Notification of Transmittal of the International Search Report and The Written Opinion of the International Searching Authority, or the Declaration; International Application No. PCT/US2022/013472; International Filing Date: Jan. 24, 2022; Date of Mailing: Apr. 5, 2022; pp. 1-20.
Taiwanese Patent Application No. 109127112 filed Aug. 10, 2020; Taiwanese Office Action dated Sep. 27, 2022; 7 pages.
Taiwanese Patent Application No. 109127112 filed Aug. 10, 2020; Taiwanese Search Report dated Nov. 30, 2021; 3 pages.
Third Party Observation for European Application No. 20852328.2; Date of Communication: Dec. 15, 2022; Date of Search: Dec. 8, 2022; 5 pages.
Japanese Office Action, Application No. 2023-544568. mailed Mar. 3, 2026, with English Translation, 10 pages.

* cited by examiner

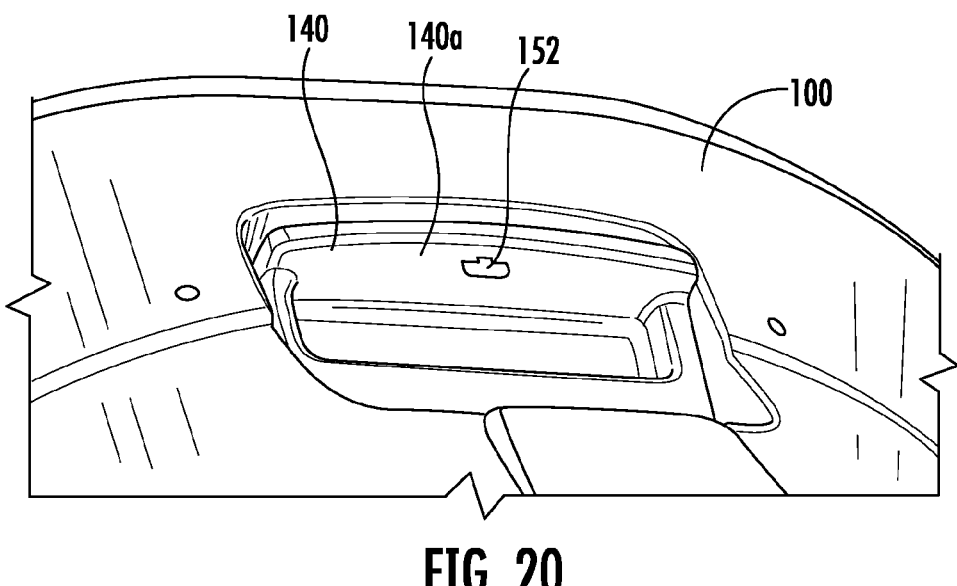
FIG. 20
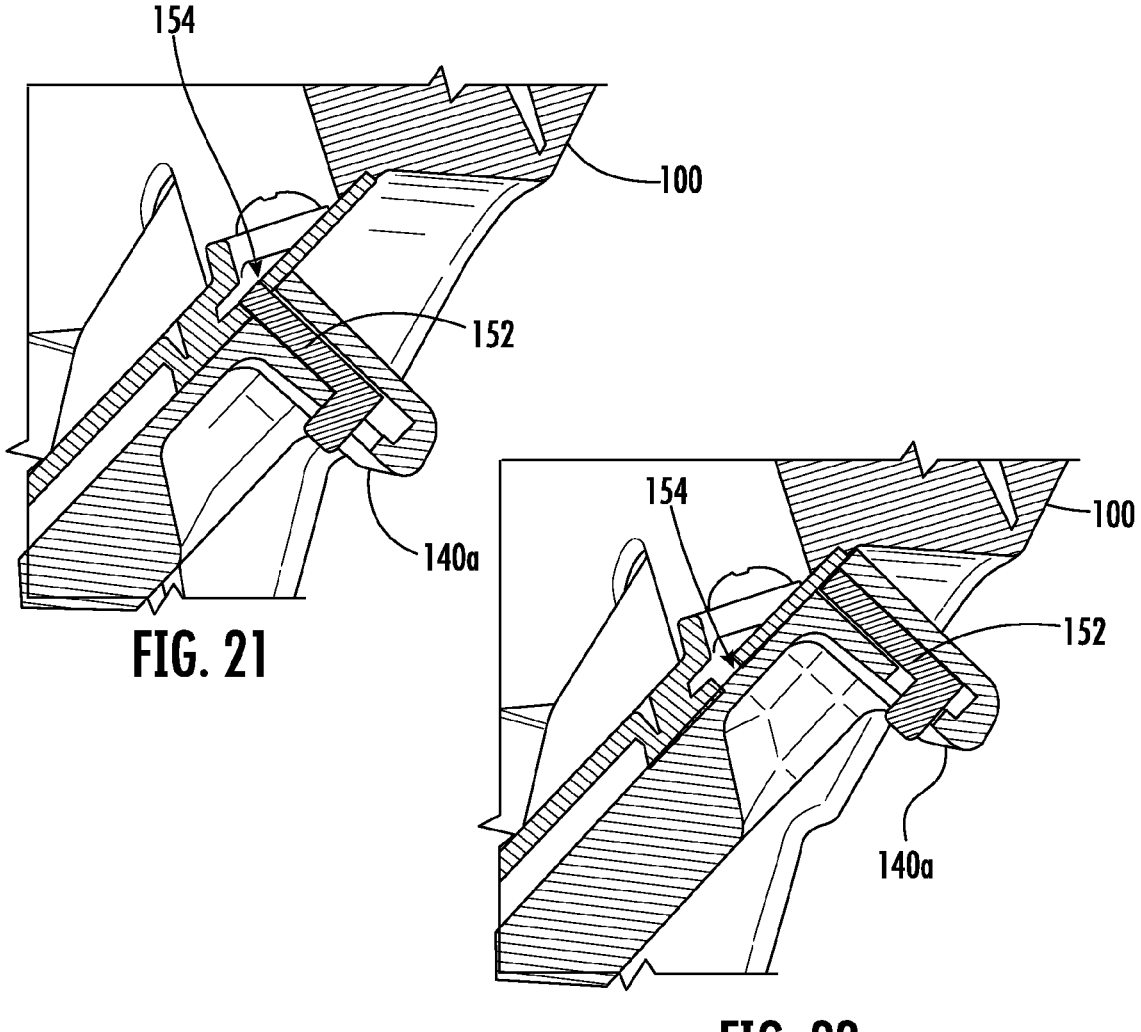
FIG. 21
FIG. 22

INFANT CAR SEAT ANCHORING ASSEMBLY WITH RETRACTABLE FOOT

CROSS-REFERENCE TO RELATED APPLICATIONS

This application is a National Stage Application of PCT/US2022/013472, filed Jan. 24, 2022, which claims priority to U.S. provisional patent application No. 63/141,061, filed Jan. 25, 2021, and U.S. provisional patent application No. 63/193,969, filed May 27, 2021, the disclosures of both of which are hereby incorporated by reference as if set forth in their entireties herein. This application is also related to international patent application no. PCT/US2020/045576, filed Aug. 10, 2020, the disclosure of which is hereby incorporated by reference as if set forth in its entirety herein.

TECHNICAL FIELD

The present disclosure relates generally to infant car seats and, in particular to systems and methods for installing infant car seats in vehicles.

BACKGROUND

Infant car seats (also known as child restraints, child restraint systems, child safety seats, and infant carriers) are used as safety seats for infants in motor vehicles, and are portable so that they can be carried by hand and/or placed on strollers. A conventional infant car seat includes a seat body that defines a seating surface, a carry handle that is rotatably mounted to the seat body, and a canopy that is rotatably mounted to the seat body via a pivoting bow. The carry handle can be used by a caregiver to carry the infant car seat. The canopy can be placed in any number of positions so as to provide shade for an infant positioned in the seat body.

A conventional infant car seat is commonly installed on a seat of a vehicle using a car seat base, where the infant car seat is removably couplable to the seat base. The seat base can be installed onto the vehicle seat using a seat belt and/or a pair of anchors that are attached to the base. Each anchor removably locks to a corresponding vehicle anchor disposed at a seat bight of the vehicle seat. The vehicle anchors can be configured in accordance with an appropriate standard, such as one or more of the ISOFIX standard, the Lower Anchors and Tethers for Children ("LATCH") standard, and the Lower Universal Anchorage System ("LUAS") standard. Once the seat base is installed onto the vehicle seat, the infant car seat is removably coupled to the seat base.

SUMMARY

In an example, an infant car seat comprises a car seat body, a first car seat anchor, a second car seat anchor, and at least one foot. The car seat body defines a seating surface for a child. Each of the first and second car seat anchors are configured to releasably lock to an anchor of the vehicle seat, are each coupled to the car seat body, and are each configured to move relative to the car seat body between a retracted position and at least one extended position. The at least one foot is coupled to the car seat body such that movement of one or both of the first and second car seat anchors between the retracted position and the at least one extended position causes the at least one foot to move relative to 1) the car seat body and 2) one or both of the first and second car seat anchors between a stowed position and at least one deployed position. The at least one foot is positioned to engage a seat pan of the vehicle seat in the at least one deployed position.

In another example, an infant car seat comprises a car seat body, a first car seat anchor, a second car seat anchor, and at least one foot. The car seat body defines a seating surface for a child. Each of the first and second car seat anchors are configured to releasably lock to an anchor of the vehicle seat, are each coupled to the car seat body, and are each configured to move relative to the car seat body between a retracted position and at least one extended position. The at least one foot is coupled to the car seat body such that movement of one or both of the first and second car seat anchors between the retracted position and the at least one extended position causes the at least one foot to move between a stowed position and at least one deployed position. The car seat body defines a recess therein that extends into one or both of the lower end and the front end, and the at least one foot is configured to be received in the recess when the at least one foot is in the stowed position. Each of the first and second car seat anchors are disposed outwardly from the recess when the first and second car seat anchors are in the retracted position.

In yet another example, an infant car seat comprises a car seat body, a first car seat anchor, a second car seat anchor, and at least one foot. The car seat body defines a seating surface for a child. Each of the first and second car seat anchors are configured to releasably lock to an anchor of the vehicle seat, are each coupled to the car seat body, and are each configured to move relative to the car seat body between a retracted position and at least one extended position. The at least one foot is coupled to the car seat body such that movement of one or both of the first and second car seat anchors between the retracted position and the at least one extended position causes the at least one foot to move between a stowed position and at least one deployed position. The first and second car seat anchors are spaced from one another so as to define a space therebetween, and the at least one foot is configured to translate within the space relative to the first and second car seat anchors.

In yet still another example, an infant car seat comprises a car seat body, a first car seat anchor, a second car seat anchor, and at least one foot. The car seat body defines a seating surface for a child. Each of the first and second car seat anchors are configured to releasably lock to an anchor of the vehicle seat, are each coupled to the car seat body, and are each configured to move relative to the car seat body between a retracted position and at least one extended position. The at least one foot is coupled to the car seat body such that movement of one or both of the first and second car seat anchors between the retracted position and the at least one extended position causes the at least one foot to move between a stowed position and at least one deployed position. The infant car seat is configured such that, when one or both of the first and second car seat anchors moves to a first one of the at least one extended position, the at least one foot moves a first distance, and when the one or both of the first and second car seat anchors moves from the first one of the at least one extended position to a second one of the at least one extended position, the at least one foot moves a second distance, less than the first distance.

In even yet still another example, an infant car seat comprises a car seat body, a first car seat anchor, a second car seat anchor, and at least one foot. The car seat body defines a seating surface for a child. Each of the first and second car seat anchors are configured to releasably lock to an anchor of the vehicle seat, are each coupled to the car seat body, and are each configured to move relative to the car seat body between a retracted position and at least one extended position. The at least one foot is coupled to the car seat body such that movement of one or both of the first and second car seat anchors between the retracted position and the at least one extended position causes the at least one foot to move between a stowed position and at least one deployed position. The infant car seat is configured such that one or both of the first and second car seat anchors moves a first distance from a first position to a second position, thereby causing the at least one foot to move a second distance, less than the first distance.

In a further example, an infant car seat, comprises a car seat body, a first car seat anchor, a second car seat anchor, and at least one movable foot. The car seat body defines a seating surface for a child. Each of the first and second car seat anchors are configured to releasably lock to an anchor of the vehicle seat, each is coupled to the car seat body, and each is configured to move relative to the car seat body between a retracted position and at least one extended position. The car seat comprises at least one shaft that couples one or both of the first and second car seat anchors to the car seat body. The car seat comprises a pair of gears having a driver gear rotationally fixed to the at least one shaft, and a driven gear that engages the driver gear and that is rotationally fixed to the at least one foot. Movement of one or both of the first and second car seat anchors between the retracted and extended positions causes the driver gear to drive the driven gear so as to move the at least one foot between a stowed position and at least one deployed position.

In yet a further example, an infant car seat, comprises a car seat body, first and second car seat anchors, at least one second latch, and an actuator. The car seat body defines a seating surface for a child. Each of the first and second car seat anchors have a latch that is configured to releasably lock to an anchor of the vehicle seat, and each of the first and second car seat anchors are coupled to the car seat body. The at least one second latch is configured to engage a frame of a stand or a child carriage so as to couple the infant car seat to the frame. The actuator is configured to actuate the latch of the first car seat anchor, the latch of the second car seat anchor, and the at least one second latch.

In yet still a further example, an infant car seat comprises a car seat body, first and second car seat anchors, an actuator, first and second links, and a coupler. The car seat body defines a seating surface for a child. Each of the first and second car seat anchors have a latch that is configured to releasably lock to an anchor of the vehicle seat. Each of the first and second car seat anchors are coupled to the car seat body. The actuator has an actuation surface that is configured to be engaged by a user to actuate the latch of at least one of the first and second car seat anchors. The first link is operatively attached to the latch of one of the first and second car seat anchors such that movement of the first link causes the latch to move between locked and unlocked positions. The second link is operatively attached to the actuation surface such that movement of the actuation surface causes movement of the second link. The coupler couples the first link and the second link to one another, and is configured to reduce an amount of force, a stroke length, or both the amount of force and the stroke length needed to actuate the latch of the one of the first and second car seat anchors.

In still another example, an infant car seat includes a car seat body that defines a seating surface for a child and at least one car seat anchor coupled to the car seat body, the at least one car seat anchor being movable relative to the car seat body between a retracted position and at least one extended position, wherein the at least one car seat anchor is retainable in the retracted position via at least one retaining member. The at least one retaining member is disposed on the car seat body. The at least one retaining member is disposed on the at least one anchor. The car seat body defines at least one pocket, and the at least one anchor is positionable in the at least one pocket when in the retracted position. The at least one car seat anchor is pivotably coupled to the car seat body, and rotatable between the retracted position and the at least one extended position. The at least one retaining member is a rigid protrusion disposed in the at least one pocket. The at least one retaining member is biased into an extended position into the at least one pocket via a biasing member, and the at least one retaining member is depressible by the at least one car seat anchor as the at least one car seat anchor is moved from the at least one extended position to the retracted position. The at least one retaining member is at least one biasing member. The at least one car seat anchor is rotatable about a shaft that couples the at least one car seat anchor to the car seat body, and the at least one biasing member is at least one torsion spring positioned proximate a coupling of the shaft and the at least one car seat anchor to bias the at least one anchor towards the retracted position. The at least one car seat anchor is a first car seat anchor and a second car seat anchor disposed at opposite ends of the shaft, and the at least one torsion spring is a first torsion spring positioned proximate a coupling between the shaft and the first car seat anchor and a second torsion spring positioned proximate a coupling between the shaft and the second car seat anchor. The at least one biasing member is a tension spring affixed to both the car seat body and the at least one car seat anchor, the tension spring being positioned to bias the at least one anchor in a direction of the retracted position. The at least one biasing member is a compression spring biasing the at least on car seat anchor against movement towards the at least one extended position. The at least one retaining member is a magnet disposed on at least one of the car seat body and the at least one car seat anchor. The at least one retaining member provides resistance against movement of the anchor from the retracted position to the at least one extended position, wherein the resistance is surmountable by a user moving the anchor towards the extended position with a manual force.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

FIG. 20 shows a perspective view of an actuation handle with actuator lock according to one example that is configured to prevent inadvertent actuation of the actuation handle;

FIG. 21 shows a cross-sectional side view of the actuation handle of FIG. 20 with the actuator lock in a locked position;

FIG. 22 shows a cross-sectional side view of the actuation handle of FIG. 20 with the actuator lock in an unlocked position and the actuation handle actuated;

DETAILED DESCRIPTION

The use of a separate car seat base to install an infant car seat can have several drawbacks when the infant car seat is to be installed in different vehicles at different times. For example, when the infant car seat is moved from one vehicle to another, the car seat base may need to be moved to the other vehicle to provide for a secure and reliable attachment of the infant car seat to the vehicle seat. Alternatively, another car seat base that is compatible with the infant car seat must already be installed in the other vehicle. However, in some situations, such as when the other vehicle is a ride share vehicle, it might not be practical to have another compatible car seat base preinstalled in the other vehicle. Further, carrying the car seat base along with the infant car seat can be cumbersome. Therefore, the ability to quickly and reliably install an infant car seat onto a vehicle seat without a car seat base would be highly desirable. Discussed herein are examples of infant car seats that can be quickly and reliably installed onto a vehicle seat without using a car seat base.

Figure 1:
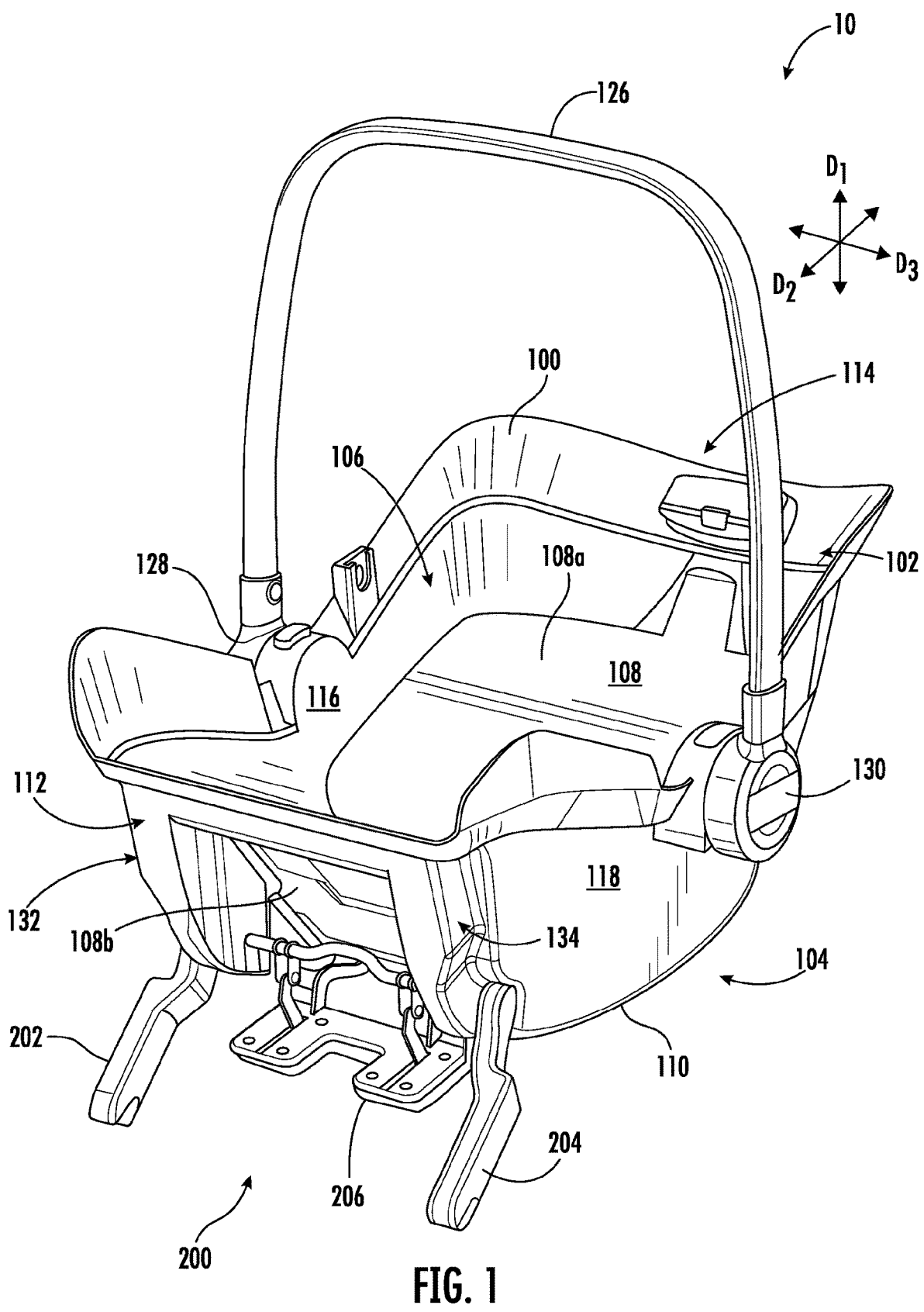
FIG. 1 shows a top, front perspective view of an infant car seat according to one example.
Figure 4:
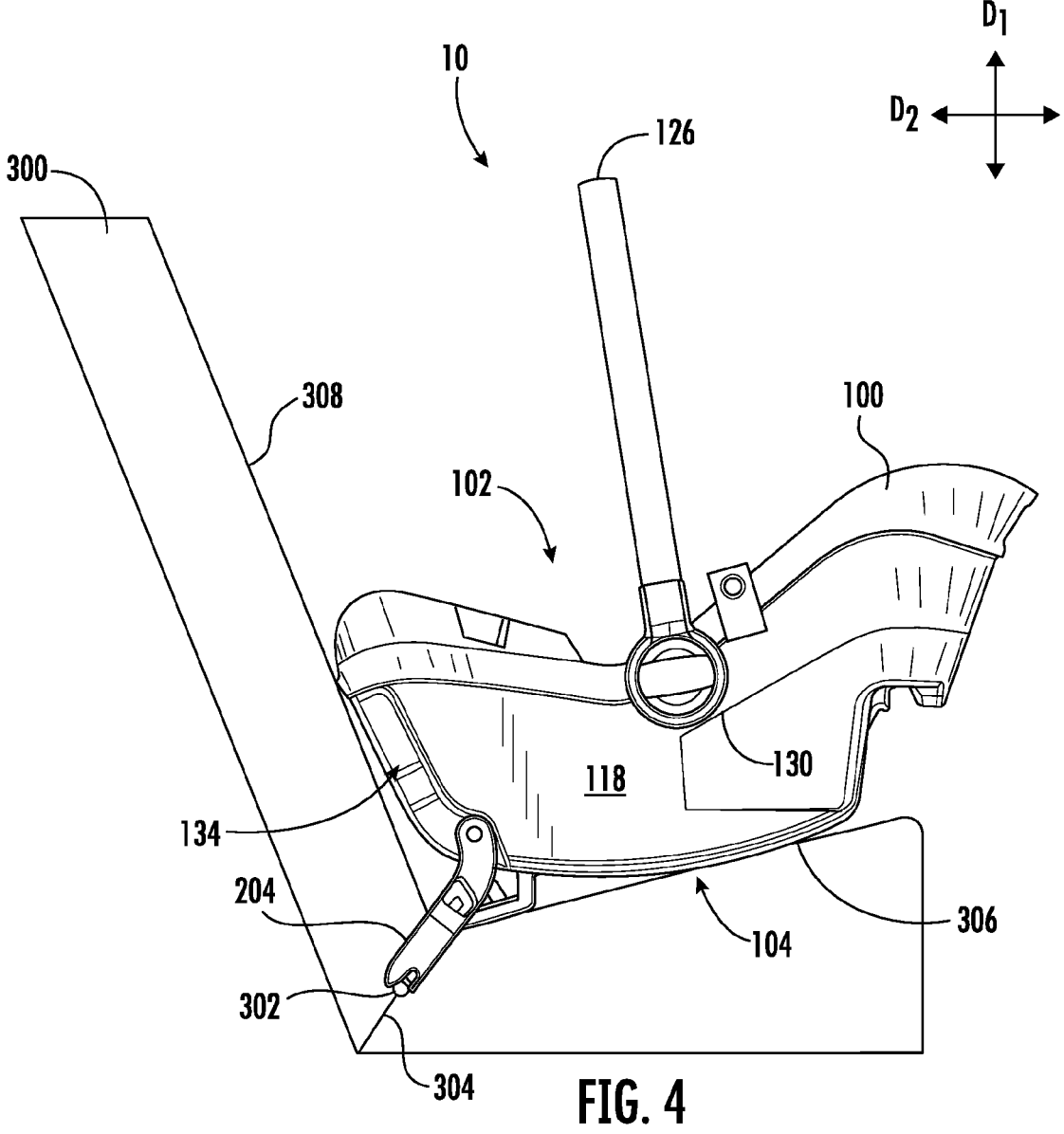
FIG. 4 shows a side view of the car seat of FIG. 1 installed on a seat of a vehicle.
Figure 8:
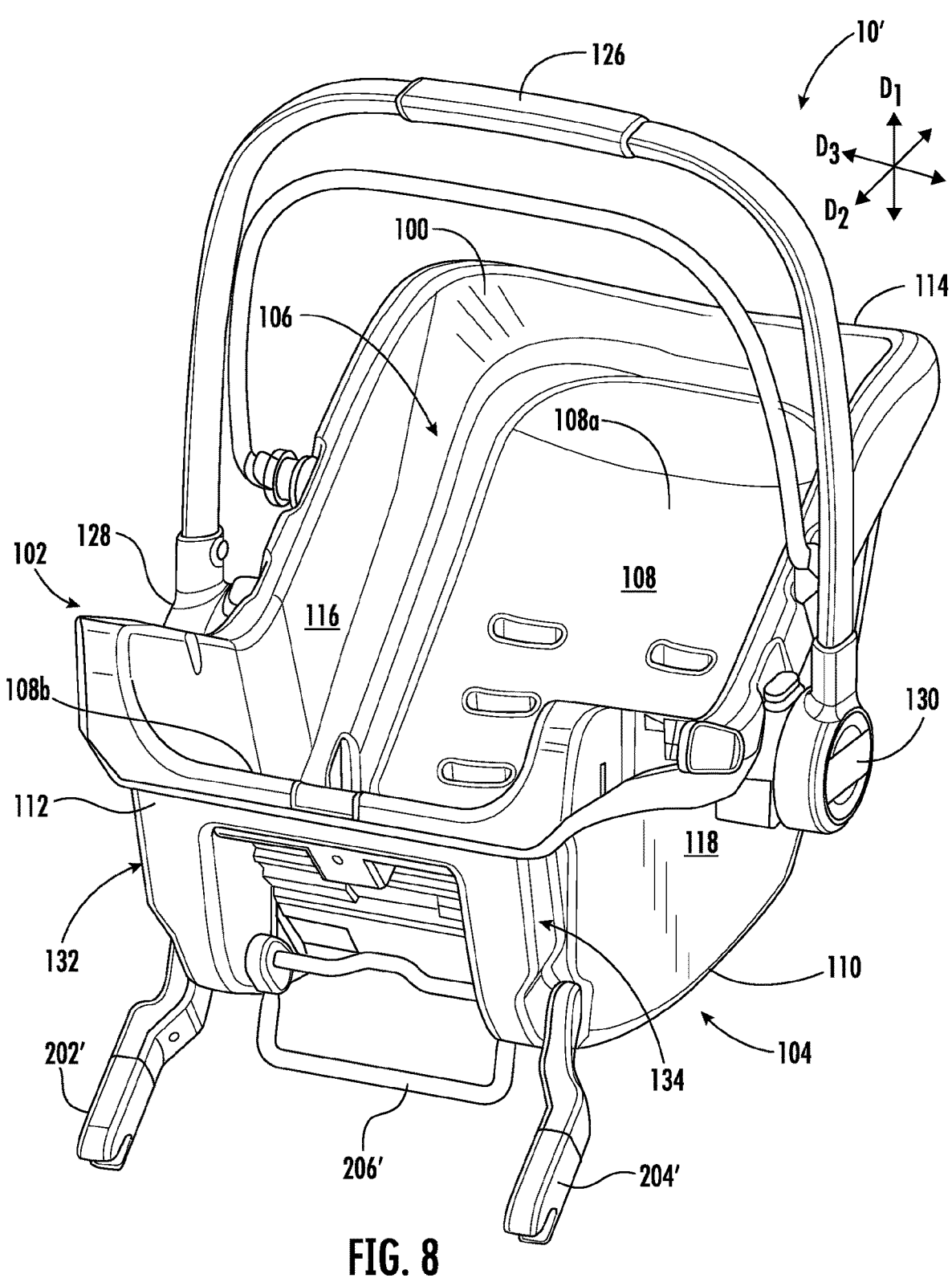
FIG. 8 shows a top, front perspective view of an infant car seat according to another example.
Figure 11:
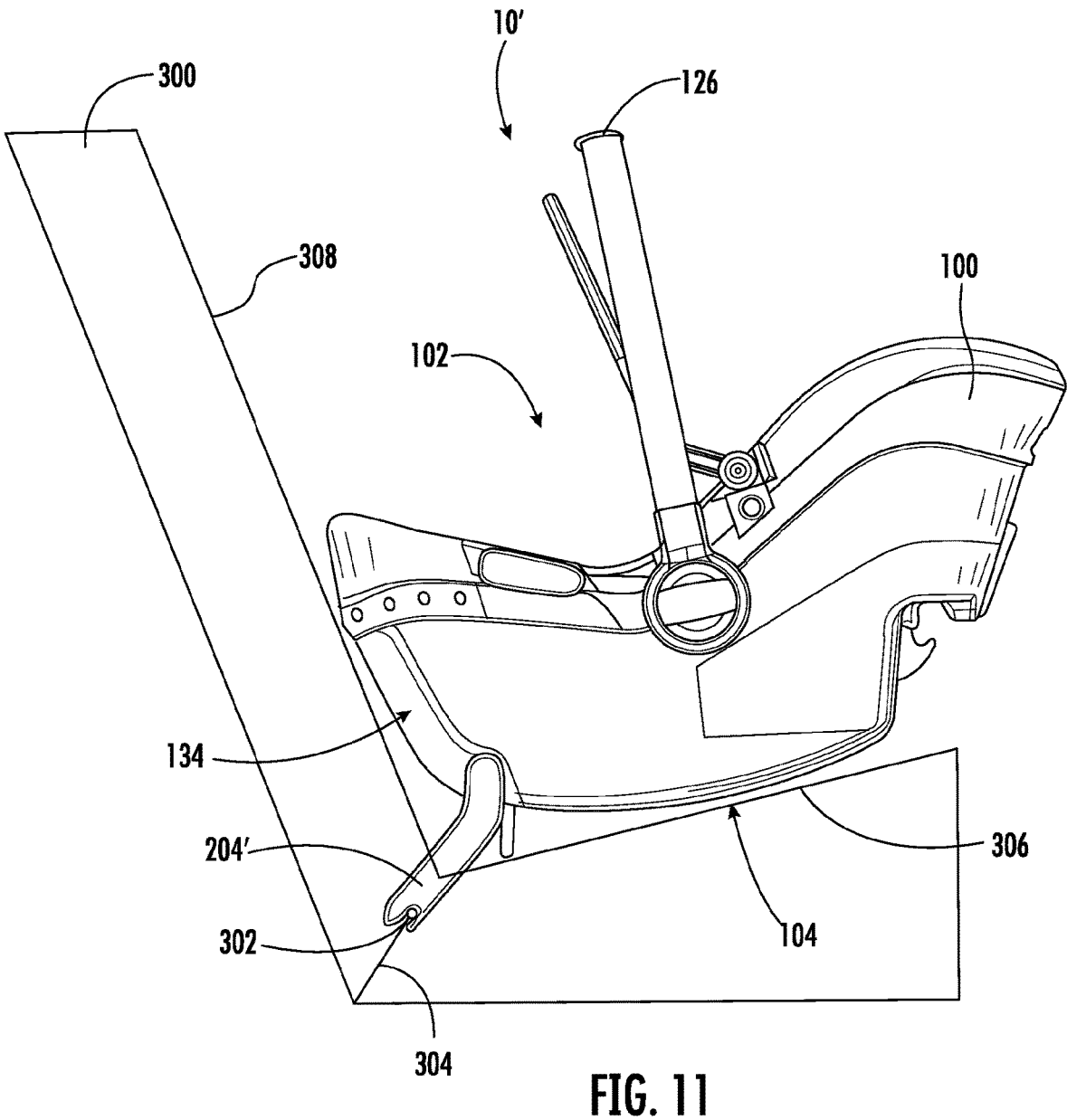
FIG. 11 shows a side view of the car seat of FIG. 8 installed on a seat of a vehicle.

Turning to FIGS. 1 and 8, in general, an infant car seat (e.g., 10, 10') of this disclosure comprises a car seat body (e.g., 100), and an anchoring assembly (e.g., 200, 200') that is configured to anchor the infant car seat body (e.g., 100) to a vehicle seat (e.g., 300 of FIGS. 4 and 11) of a vehicle. The anchoring assembly (e.g., 200, 200') comprises a first car seat anchor (e.g., 202, 202'), a second car seat anchor (e.g., 204, 204'), and can optionally comprise at least one movable foot (e.g., 206, 206'). The first car seat anchor (e.g., 202, 202') is movably coupled to the infant car seat body (e.g., 100) such that the first car seat anchor (e.g., 202, 202') is configured to move relative to the car seat body (e.g., 100) between a retracted position (FIGS. 2 and 9) and at least one extended position (FIGS. 1 and 8). The first car seat anchor (e.g., 202, 202') is configured to removably fasten to a first vehicle anchor (e.g., 302 of FIGS. 4 and 11) disposed at a bight (e.g., 304 of FIGS. 4 and 11) of the vehicle seat (e.g., 300 of FIGS. 4 and 11). Similarly, the second car seat anchor (e.g., 204, 204') is movably coupled to the infant car seat body (e.g., 100) such that the second car seat anchor (e.g., 204, 204') is configured to move relative to the car seat body (e.g., 100) between a retracted position (e.g., FIGS. 2 and 9) and at least one extended position (e.g., FIGS. 1 and 8). The second car seat anchor (e.g., 204, 204') is configured to removably fasten to a second vehicle anchor (e.g., 302 of FIGS. 4 and 11) disposed at a bight (e.g., 304 of FIGS. 4 and 11) of the vehicle seat (e.g., 300). The vehicle anchors (e.g., 302) can be any suitable anchors. For example, each vehicle anchor (e.g., 302) can be shaped as a bar that is configured to be engaged by one of the first and second car seat anchors (e.g., 202, 202', 204, 204'). The vehicle anchors (e.g., 302) can be configured in accordance with an appropriate standard, such as one or more of the ISOFIX standard, the Lower Anchors and Tethers for Children ("LATCH") standard, and the Lower Universal Anchorage System ("LUAS") standard.

The at least one foot (e.g., 206, 206') is coupled to the car seat body (e.g., 100) such that movement of one or both of the first and second car seat anchors (e.g., 202, 202', 204, 204') between the retracted position and the at least one extended position causes the at least one foot (e.g., 206, 206') to move relative to 1) the car seat body (e.g., 100) and 2) one or both of the first and second car seat anchors (e.g., 202, 202', 204, 204') between a stowed position (e.g., FIGS. 2 and 9) and at least one deployed position (e.g., FIGS. 1 and 8). The at least one foot (e.g., 206, 206') is positioned to engage a seat pan (e.g., 104 of FIGS. 4 and 11) of the vehicle seat (e.g., 300) when the at least one foot (e.g., 206, 206') is in the at least one deployed position.

Turning to FIGS. 1 to 4, an infant car seat 10 is shown according to one example. The infant car seat 10 comprises a car seat body 100 having an upper end 102 and a lower end 104, opposite one another along a first direction $D_1$. The upper end 102 defines a recess 106 that extends therein towards the lower end 104 and that terminates at a seating surface 108 that is configured to support an infant thereon. The seating surface 108 can comprise a seat back 108a and a seat pan 108b. Note that the underside of the seat pan 108b is shown in FIG. 1. Although not shown, the infant car seat 10 can comprise soft goods disposed within the recess 106 that is configured to provide cushioning to the infant.

The lower end 104 has a bottom surface 110 configured to rest on a vehicle seat pan 306 (see FIG. 4) of the vehicle seat 300 on which the infant car seat 10 is installed when the infant car seat 10 is installed in the vehicle. The infant car seat body 100 comprises a front end 112 and a back end 114, opposite one another along a second direction $D_2$, perpendicular to the first direction $D_1$. The front end 112 is configured to face a vehicle seat back 308 (see FIG. 4) of the vehicle seat 300 on which the infant car seat 10 is installed when the infant car seat 10 is installed in the vehicle. Conversely, the back end 114 is configured to face away from the vehicle seat back 308 of the vehicle seat 300 on which the infant car seat 10 is installed when the infant car seat 10 is installed in the vehicle. The infant car seat body 100 comprises a first sidewall 116 and a second sidewall 118, opposite one another along a third direction $D_3$, perpendicular to the first and second directions $D_1$ and $D_2$. The recess 106 can be defined between the first and second sidewalls 116 and 118.

In some examples, the bottom surface 110 can be curved as it extends along the second direction $D_2$ so as to define a rocking surface on which the infant car seat 10 can be rocked back and forth along the second direction $D_2$ when the infant car seat 10 is supported on a floor. For example, the bottom surface 110 can be curved such that, when the infant car seat 10 is disposed on a planar surface, a portion of the bottom surface 110 between the front end 112 and the back end 114 contacts the planar surface, and the bottom surface 110 is spaced from the planar surface at one or both of the front end 112 and the back end 114. However, it will be understood that, in alternative examples, the bottom surface 110 need not be curved and need not define a rocking surface.

Figures 2, 3:
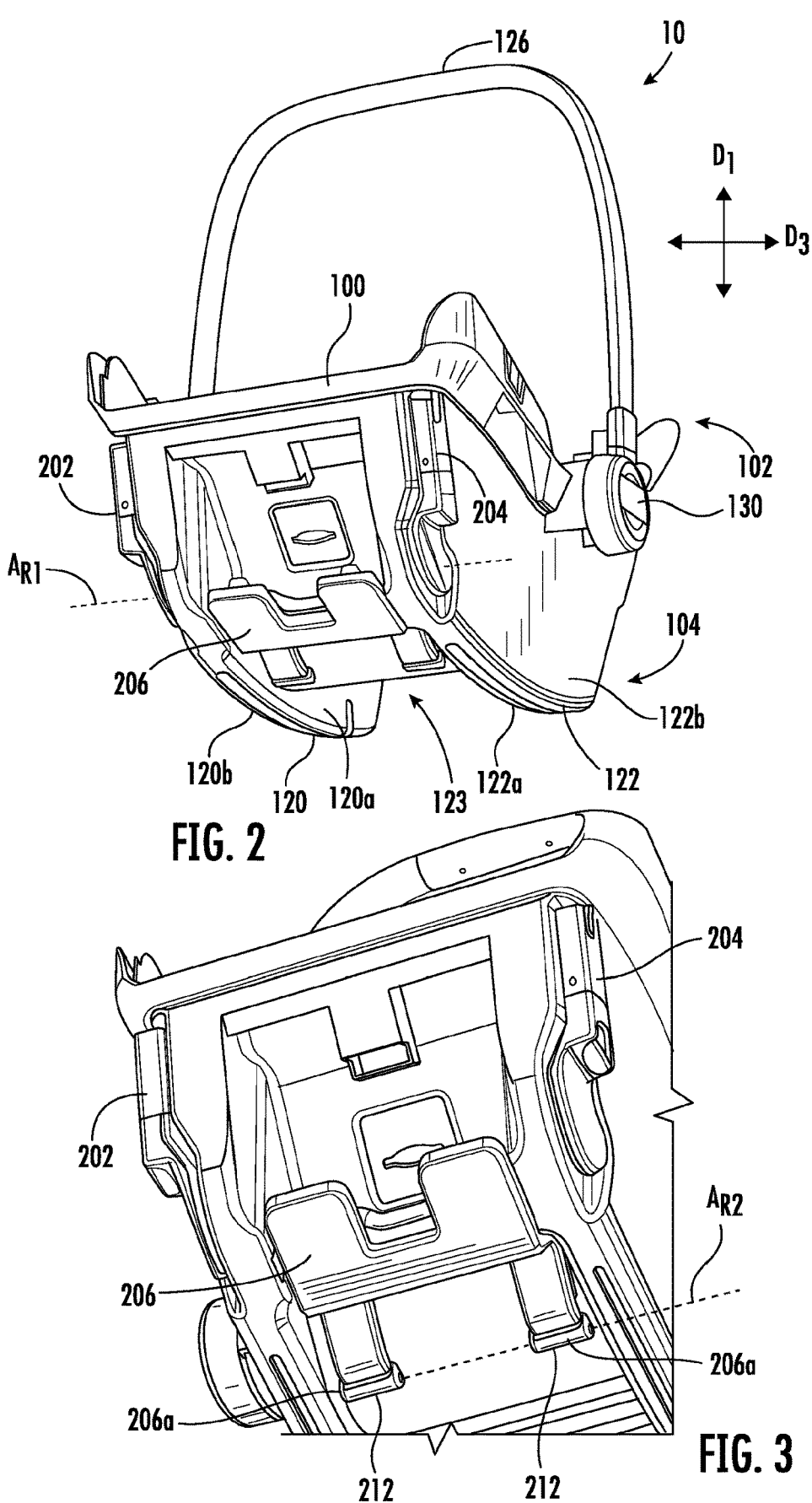
FIG. 2 shows a bottom, front perspective view of the infant car seat of FIG. 1.
FIG. 3 shows an enlarged view of a portion of the bottom, front perspective view of FIG. 2.

As can best be seen in FIGS. 2 and 3, in some examples, the lower end 104 can comprise a first rail 120 and a second rail 122 that are spaced from one another along the third direction $D_3$. The first rail 120 can be defined at the first side 116 and the second rail 122 can be defined as the second side 118. Each of the first and second rails 120 and 122 can have an inner surface 120a, 122a and an outer surface 120b, 122b that are opposite from one another along the third direction $D_3$. Each of the first and second rails 120 and 122 can have a length along the second direction $D_2$ that is greater than a width of the rail 120 or 122 along the third direction $D_3$. Thus, each rail 120 and 122 can be elongate along the second direction $D_2$. The lower end 104 can define a space 123 between the first rail 120 and the second rail 122. For example, the inner surface 120a of the first rail 120 can oppose the inner surface 122a of the second rail 122 so as to define the space 123 therebetween. Each rail 120 and 122 can comprise a portion of the bottom surface 110. As will be described in further detail below, in some examples, the at least one foot 206 can be positioned in the space 123 between the rails 120 and 122 when the at least one foot 206 is in a stowed position. It will be understood that, in alternative examples, the lower end 104 need not have first and second rails. In some such alternative examples, the at least one foot 206 could be stowed in a pocket (not shown) formed in the lower end 104 of the car seat body 100 or could be stowed against the bottom surface 110 of the car seat body 100.

Referring to FIGS. 1 and 2, the infant car seat 10 can comprise a handle 126, a first handle coupler 128, and a second handle coupler 130. The first handle coupler 128 can be configured to couple the handle to the first side 116 of the car seat body 100, and the second handle coupler 130 can be configured to couple the handle to the second side 118 of the car seat body 100. In some examples, the first and second couplers 128 and 130 can be configured to rotatably couple the handle to the first and second sides 116 and 118, respectively, such that the handle 126 is rotatable relative to the car seat body 100. The handle 126 can extend above the upper end 102 of the car seat body 100 such that the handle 126 can be grasped by a caregiver to carry an infant supported within the infant car seat 10. The handle 126 can have a grasping portion that extends along the third direction $D_3$ and that is configured to be grasped by the caregiver.

In some examples, the car seat body 100 can comprise a pocket for each of the first and second car seat anchors 202 and 204. For example, the car seat body 100 can comprise a first pocket 132 configured to receive the first car seat anchor 202 when the first car seat anchor 202 is in a stowed position. Similarly, the car seat body 100 can comprise a second pocket 132 configured to receive the second car seat anchor 204 when the second car seat anchor 204 is in a stowed position. Each pocket 132 and 134 can have a shape that conforms to a respective one of the first and second seat anchors 202 and 204. Each of the first and second pockets 132 and 134 can extend into the front end 112 of the car seat body 100. In some examples, as shown, the first pocket 132 can extend into the first sidewall 116 along the third direction $D_3$ towards the second sidewall 118 such that the first pocket 132 is open at an outer surface of the first sidewall 116. Similarly, the second pocket 134 can extend into the second sidewall 118 along the third direction $D_3$ towards the first sidewall 116 such that the second pocket 134 is open at an outer surface of the second sidewall 118. It will be understood, however, that the infant car seat 10 can be devoid of the first and second pockets 132 and 134, or the first and second pockets 132 and 134 can be configured in any other suitable manner. For example, the first and second pockets 132 and 134 can be closed at the outer surfaces of the first and second sidewalls 116 and 118, respectively, such that the first and second seat anchors 202 and 204 are enclosed within the first and second pockets 132 and 134, respectively, when the first and second seat anchors 202 and 204 are in the retracted position.

Figure 5:
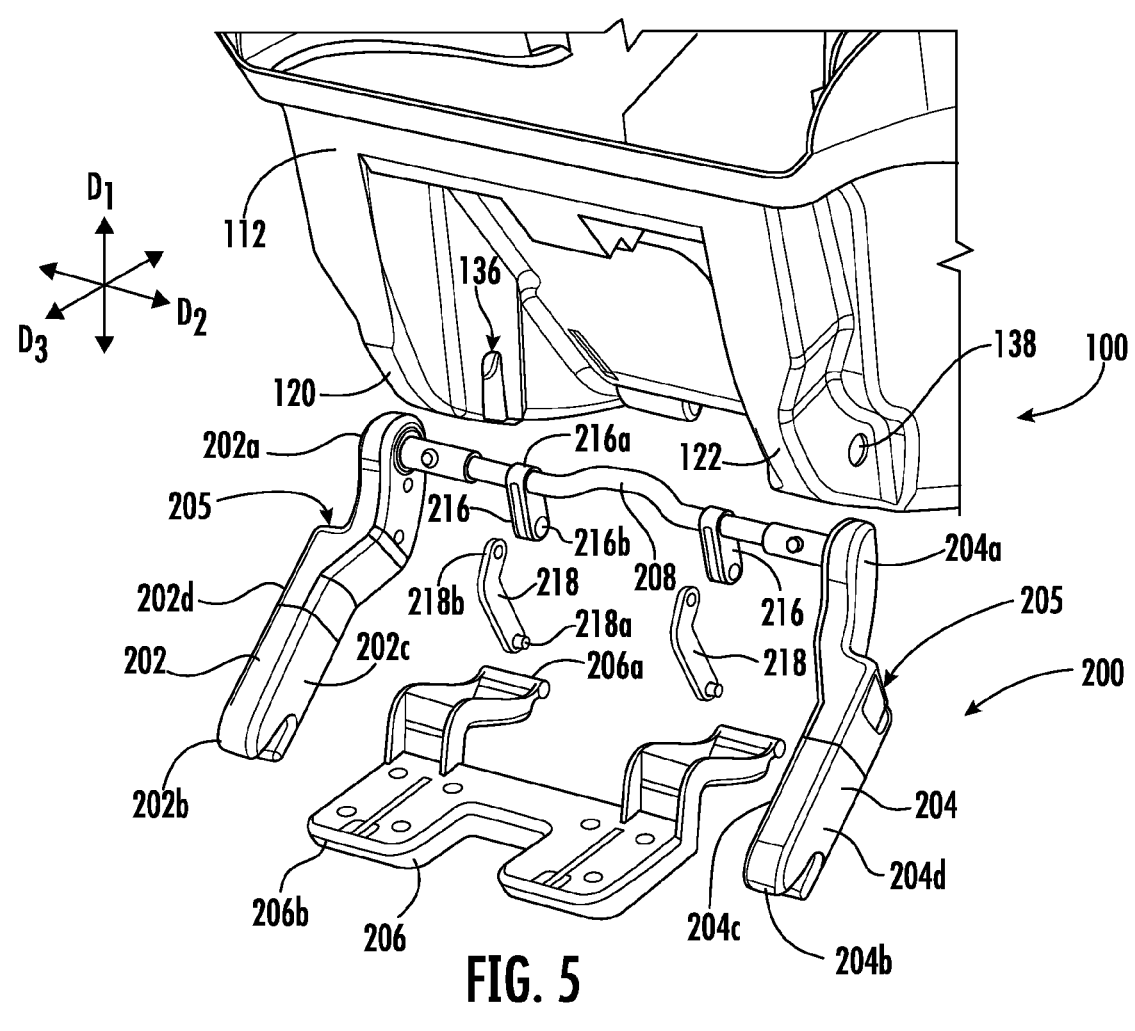
FIG. 5 shows a perspective view of a portion of the infant car seat of FIG. 1, with an anchoring assembly of the infant car seat partially exploded.
Figure 6:
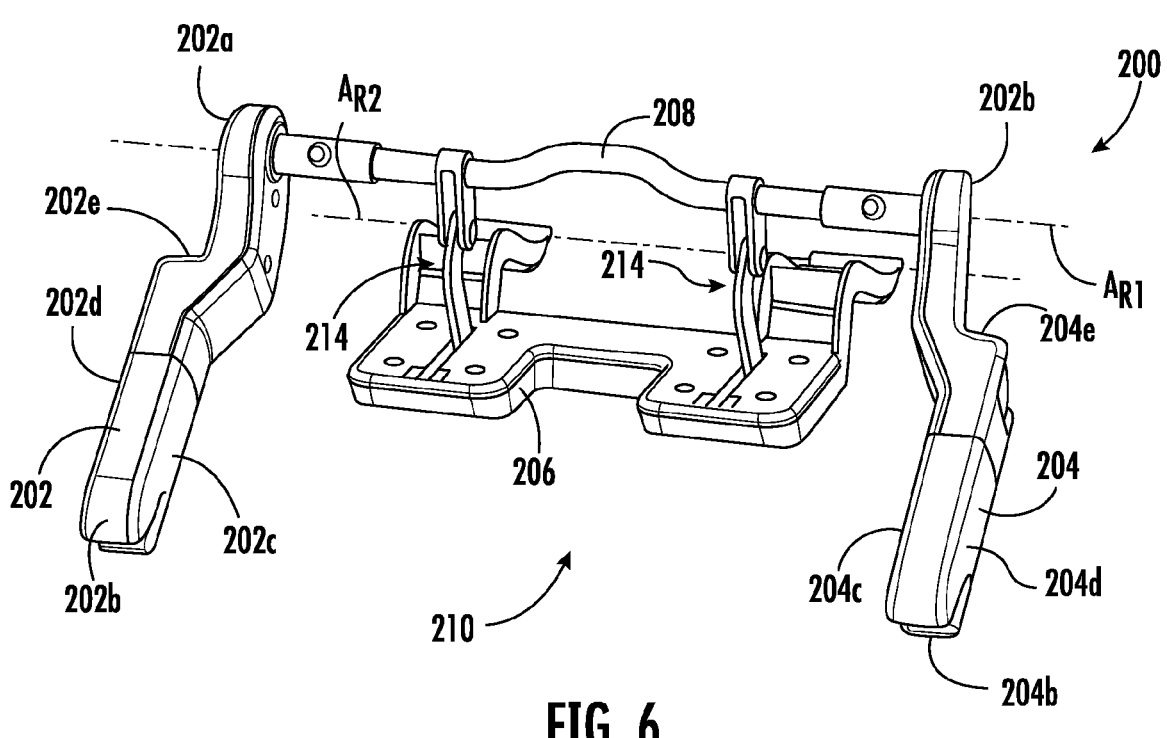
FIG. 6 shows a perspective view of the anchoring assembly of the infant car set of FIG. 1.

Turning to FIGS. 5 and 6, the anchoring assembly 200 and the car seat body 100 are coupled to one another such that the anchoring assembly 200 is movable relative to the car seat body 100. More specifically, the anchoring assembly 200 and the car seat body 100 are coupled to one another such that each of the first and second car seat anchors 202 and 204 are moveable between a retracted position (shown in FIGS. 2 and 7A) and at least one extended position (shown in FIGS. 1 and 7B to 7F). The first and second car seat anchors 202 and 204 are coupled to the car seat body 100 adjacent to the front end 112, such as between (1) the handle couplers 128 and 130 and (2) the front end 112. In some examples, the first and second car seat anchors 202 and 204 are each movable between the retracted position and a plurality of extended positions (e.g., as shown in FIGS. 7B to 7F). In each extended position, a free end of each of the first and second car seat anchors 202 and 204 extends beyond the front end 112 of the car seat body 100. In at least some of the extended positions, a free end of each of the first and second car seat anchors 202 and 204 extends beyond the bottom surface 110 of the car seat body 100. Each car seat anchor 202 and 204 can be moved to a select one of the extended positions that corresponds to a position of one of the first and second vehicle anchors 302 of the vehicle seat 300.

In the retracted position, each of the first and second car seat anchors 202 and 204 extends beyond one or both of the front end 112 and the bottom surface 110 less than when the first or second car seat anchor 202 and 204 is in one of the extended positions, and in some examples, does not extend beyond one or both of the front end 112 and the bottom surface 110. In other words, the free end of each of the car seat anchors 202 and 204 is closer to the car seat body 100 in the retracted position than in the extended position. In embodiments that implement the first and second pockets 132 and 134, the first and second car seat anchors 202 and 204 can be received in the first and second pockets 132 and 134, respectively, when in the retracted position.

The first and second car seat anchors 202 and 204 can be coupled to the car seat body 100 in any suitable manner such that the first and second car seat anchors 202 and 204 are movable between the at least one extended position and the retracted position. In various examples, the first and second car seat anchors 202 and 204 can be configured to rotate and/or translate and/or telescope and/or move in any other suitable manner. FIGS. 1 to 4 show one example manner of coupling the first and second car seat anchors 202 and 204 to the car seat body 100. In this example, the first and second car seat anchors 202 and 204 are each configured to rotate about a first axis of rotation $A_{R1}$. The first and second car seat anchors 202 and 204 have free ends 202b and 204b, respectively, that are each configured to rotate away from the front end 112 and downward (i.e., counterclockwise as viewed along a direction from a left-hand side to a right-hand side of the seat 10, where the left-hand side is adjacent the child's left arm) as they transition from the retracted position towards the at least one extended position. The free ends 202b and 204b are each configured to rotate towards the front end 112 and upwards (i.e., clockwise as viewed along a direction from a left-hand side to a right-hand side of the seat 10, where the left-hand side is adjacent the child's left arm) as they transition from the at least one extended position towards the retracted position.

The anchoring assembly 200 can comprise at least one shaft 208 that couples the anchoring assembly 200 to the seat body 100. Although one shaft 208 is shown, it will be understood that the anchoring assembly 200 could alternatively comprise a separate shaft for each of the first and second car seat anchors 202 and 204. The at least one shaft 208 can extend between the first and second car seat anchors 202 and 204. Further, the car seat body 100 can define at least one opening 136, 138 that is configured to receive the at least one shaft 208 of the anchoring assembly 200 such that the at least one shaft 208 is rotatable within the at least one opening 136, 138. The at least one opening can comprise a first opening 136 and a second opening 138 that are spaced from one another along the third direction $D_3$. The shaft 208 and/or the first and second openings 136 and 138 can define the first axis of rotation $A_{R1}$. The first opening 136 can be disposed at the first sidewall 116 of the car seat body 100 and the second opening 138 can be disposed at the second sidewall 118 of the car seat body 100. In example infant car seats that include rails 120 and 122, the first and second openings 136 and 138 can extend entirely through the first and second rails 120 and 122, respectively.

The shaft 208 can be received through the first and second openings 136 and 138 such that first car seat anchor 202 is disposed outwardly from the first opening 136 along the third direction $D_3$ and the second car seat anchor 204 is disposed outwardly from the second opening 138 along the third direction $D_3$. Thus, the car seat body 100 can be disposed between the first and second car seat anchors 202 and 204. It will be understood, however, that the first and second car seat anchors 202 and 204 could alternatively be disposed inwardly from the first and second openings 136 and 138, respectively.

The shaft 208 is rotationally fixed to the first and second seat anchors 202 and 204. In other words, the shaft 208 is coupled to the first and second seat anchors 202 and 204 such that rotation of the shaft 208 causes a corresponding rotation of the first and second seat anchors 202 and 204, and vice versa. The first seat anchor 202 can comprise a first end 202a and a second end 202b. The first seat anchor 202 can comprise an inner surface 202c and an outer surface 202d that are offset from one another along the third direction $D_3$. The first seat anchor 202 can be elongate from the first end 202a to the second end 202b. The first seat anchor 202 can extend along an anchor axis $A_A$ from the first end 202a to the second end 202b. The anchor axis $A_A$ (labeled in FIGS. 7A to 7F) can be bent as shown or can be curved or straight. The anchor axis $A_A$ can be bent at an angle that is between 0 degrees and 90 degrees, such as at an angle between 10 degrees and 80 degrees, such as at an angle between 20 degrees and 70 degrees, such as at an angle that is between 30 degrees and 60 degrees.

The first end 202a can be coupled to the shaft 208. The second end 202b can be a free end that is not attached to the car seat body 100. In some examples, the first end 202a can be recessed inward relative to the second end 202b. For instance, the first seat anchor 202 can define a shoulder 202e between the first end 202a and the second end 202b along the outer surface 202d. The shoulder 202e can define a support surface for supporting the infant car seat 10 on an infant car seat ring of a stroller as described below in relation to FIGS. 23 and 24. The second end 202b can comprise a latch that is configured to releasably lock to the first vehicle anchor 302. In one example, the latch can define a recess that is configured to receive the first vehicle anchor 302 therein, and a spring-loaded catch that is configured to secure the first vehicle anchor 302 in the recess. It will be understood, however, that the latch can have any other suitable configuration. The latch can be configured to transition between a locked state and an unlocked state. The first seat anchor 202 can comprise an actuator 205 that is configured to transition the latch between the locked and unlocked states. The actuator 205 can have an actuation surface that is configured to be engaged by a caregiver to actuate the actuator 205. For example, the actuator 205 can have a push button that is retractable within the first seat anchor 202 and configured to be depressed by a caregiver.

Similarly, the second seat anchor 204 can comprise a first end 204a and a second end 204b. The second seat anchor 204 can comprise an inner surface 204c and an outer surface 204d that are offset from one another along the third direction D₃. The inner surfaces 202c and 204c of the first and second car seat anchors 202 and 204 can be opposite one another so as to define a space 210 therebetween. The first seat anchor 204 can be elongate from the first end 204a to the second end 204b. The second seat anchor 204 can extend along an anchor axis A_A from the first end 204a to the second end 204b. The anchor axis A_A can be bent as shown or can be curved or straight. The anchor axis A_A can be bent at an angle that is between 0 degrees and 90 degrees, such as at an angle between 10 degrees and 80 degrees, such as at an angle between 20 degrees and 70 degrees, such as at an angle that is between 30 degrees and 60 degrees.

The first end 204a can be coupled to the shaft 208. The second end 204b can be a free end that is not attached to the car seat body 100. In some examples, the first end 204a can be recessed inward relative to the second end 204b. For instance, the second seat anchor 204 can define a shoulder 204e between the first end 204a and the second end 204b along the outer surface 204d. The shoulder 204e can define a support surface for supporting the infant car seat 10 with an infant car seat ring of a stroller as described below in relation to FIGS. 23 and 24. The second end 204b can comprise a latch that is configured to releasably lock to the second vehicle anchor 302. The latch can be configured to transition between a locked state and an unlocked state. The second seat anchor 204 can comprise an actuator 205 that is configured to transition the latch between the locked and unlocked states. The actuator 205 can have an actuation surface that is configured to be engaged by a caregiver to actuate the actuator 205. For example, the actuator 205 can have a push button that is retractable within the second seat anchor 204 and configured to be depressed by a caregiver.

With continued reference to FIGS. 5 and 6, the at least one foot 206 is coupled to the car seat body 100 such that the at least one foot 206 is movable between at least one deployed position (shown in FIG. 1) and a stowed position (shown in FIG. 2). In the at least one deployed position, the at least one foot 206 is positioned to engage a seat pan 306 (shown in FIG. 4) of the vehicle seat so as to limit, or prevent altogether, rotation of the front end 112 of the infant car seat 10 towards the seat pan 306. Further, in the at least one deployed position, the at least one foot 206 extends beyond one or both of the bottom surface 110 and the front end 112. In the stowed position, the at least one foot 206 extends beyond one or both of the front end 112 and the bottom surface 110 less than when the at least one foot 206 is in the at least one deployed position, and in some examples, does not extend beyond one or both of the front end 112 and the bottom surface 110 at all. As discussed above, in example infant car seats having first and second rails 120 and 122, the at least one foot 206 can be positioned between the first and second rails 120 and 122 when the at least one foot 206 is in the stowed position.

The at least one foot 206 is coupled to at least one of the first and second car seat anchors 202 and 204 such that movement of one or both of the first and second car seat anchors 202 and 204 causes the at least one foot 206 to move relative to both 1) the car seat body 100 and 2) one or both of the first and second car seat anchors 202 and 204. As will be described further below, movement of one or both of the first and second car seat anchors 202 and 204 causes a movement of the at least one foot 206 that is different from the movement of one or both of the first and second car seat anchors 202 and 204. The at least one foot 206 can be spaced inwardly from the inner surfaces 202c and 204c of the first and second anchors 202 and 204 such that the at least one foot 206 is not in contact with the first and second anchors 202 and 204. In some examples, the at least one foot 206 can be configured to move into and out of the space 210 between the first and second car seat anchors 202 and 204.

In various examples, the at least one foot 206 can be configured to rotate and/or translate and/or telescope and/or move in any other suitable manner. The figures show one example manner of coupling the at least one foot 206 to the car seat body 100. In this example, the at least one foot 206 is configured to rotate about a second axis of rotation A_{R2}. The at least one foot 206 has a free end 206b that is configured to rotate away from the front end 112 and downward (i.e., counterclockwise as viewed along a direction from a left-hand side to a right-hand side of the seat 10, where the left-hand side is adjacent the child's left arm) as the at least one foot 206 transitions from the stowed position towards the at least one deployed position. The free end 206b is configured to rotate towards the front end 112 and upwards (i.e., clockwise as viewed along a direction from a left-hand side to a right-hand side of the seat 10, where the left-hand side is adjacent the child's left arm) as it transitions from the at least one deployed position towards the stowed position.

The at least one foot 206 can have a first end 206a that is coupled to the car seat body 100, and a second end 206b, opposite the first end 206a. The second end 206b is a free end that is free from attachment to the car seat body 100. The first end 206a can be rotationally coupled to the lower end 104 of the car seat body 100. For example, as can be seen in FIG. 3, the first end 206a can be coupled to the car seat body 100 so as to define at least one hinge (or joint) 212, such as a pair of hinges 212 that are offset from one another along the third direction D₃. The at least one foot 206 can be configured to pivot about the at least one hinge 212 between the at least one deployed position and the stowed position. Thus, the at least one hinge 212 can define the second axis of rotation A_{R2}. The at least one foot 206 can have a bottom surface 206c that is configured to engage the seat pan 306 of the vehicle seat 300 when the at least one foot 206 is in the at least one deployed position.

The anchoring assembly 200 can comprise at least one linkage 214 that is configured to moveably couple the at least one foot 206 to one or both of the first and second car seat anchors 202 and 204. For example, the at least one linkage 214 can comprise first and second linkages 214 that are spaced from one another along the third direction $D_3$. Each linkage 214 can comprise at least one link, such as a first link 216 and a second link 218. The first link 216 can have a first end 216a that is coupled to the shaft 218 such that rotation of the shaft 218 causes a corresponding rotation of the first link 216. The first link 216 can have a second end 216b that is pivotably coupled to the second link 218 so as to define a pivot axis $A_p$. The second link 218 can have a first end 218a that is pivotably coupled to the foot 206, and a second end 218b that is pivotably coupled to the second end 216b of the first link 216. At least one of the first and second links 216 and 218 can be bent. For example, one of the first and second links 216 and 218 can be bent in a plane that extends along the first and third directions $D_1$ and $D_3$. The one of the first and second links 216 and 218 can be bent at an angle that is between 0 degrees and 90 degrees, such as at an angle between 10 degrees and 80 degrees, such as at an angle between 20 degrees and 70 degrees, such as at an angle that is between 30 degrees and 60 degrees. It will be understood that, in alternative examples, the at least one linkage can be configured in another suitable manner. In one such alternative example, the at least one linkage can have more than two links.

Although the figures show one example of an infant car seat having a single foot 206, it will be understood that, in alternative examples, an infant car seat can have more than one foot. For example, an infant car seat can have first and second feet that are offset from one another along the third direction $D_3$. A first one of the feet can be coupled to the first car seat anchor 202 such that movement of first car seat anchor 202 causes the first foot to move relative to the first car seat anchor 202, and a second one of the feet can be coupled to the second car seat anchor 204 such that movement of second car seat anchor 204 causes the second foot to move relative to the second car seat anchor 204.

Figures 7A, 7B, 7C, 7D, 7E, 7F:
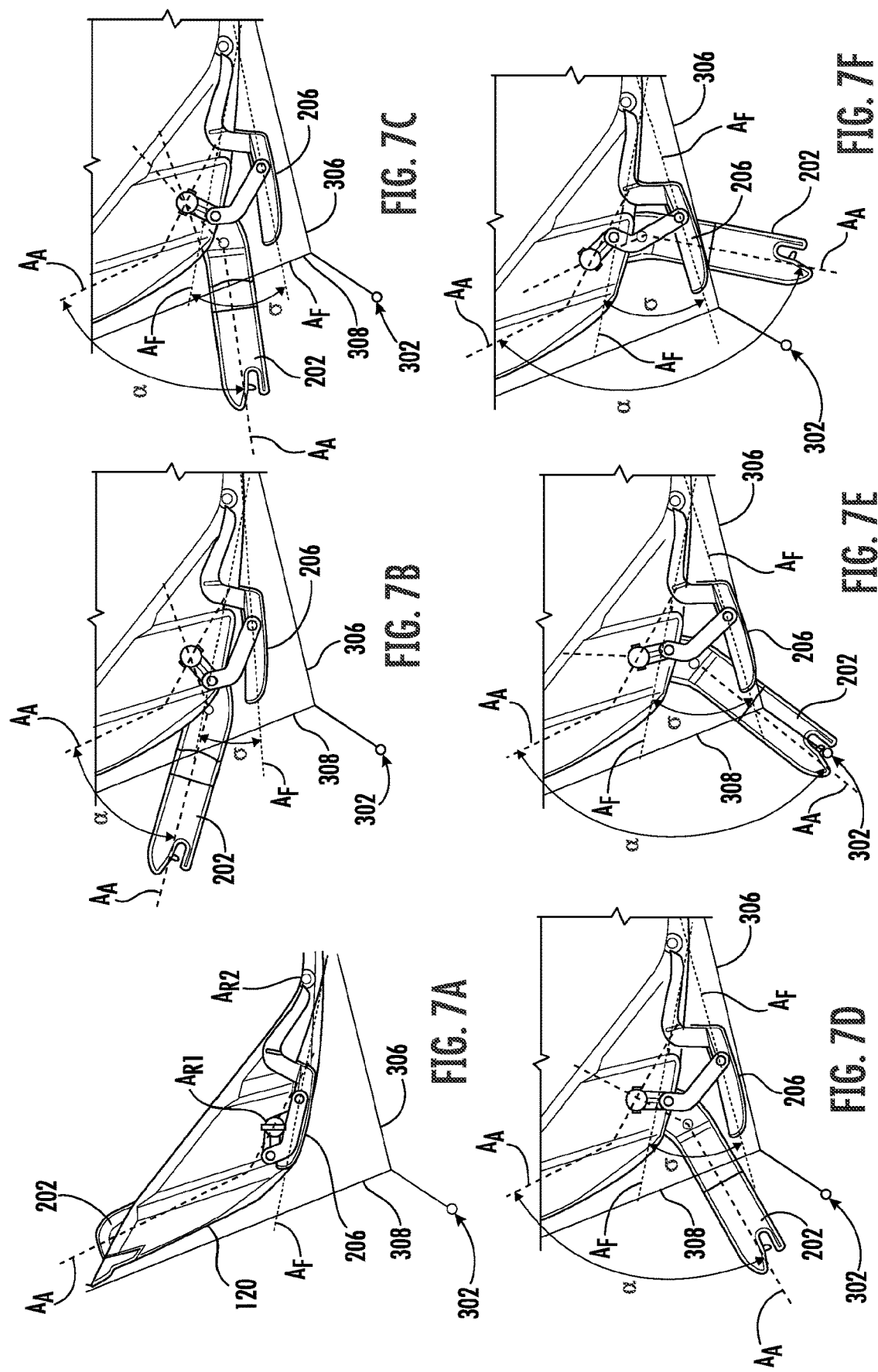
FIG. 7A shows a cross-sectional side view of a portion of the infant car seat of FIG. 1 with a first car seat anchor in a retracted position and a foot in a stowed position.
FIG. 7B shows a cross-sectional side view of a portion of the infant car seat of FIG. 1 with a first car seat anchor in a first extended position.
FIG. 7C shows a cross-sectional side view of a portion of the infant car seat of FIG. 1 with a first car seat anchor in a second extended position.
FIG. 7D shows a cross-sectional side view of a portion of the infant car seat of FIG. 1 with a first car seat anchor in a third extended position.
FIG. 7E shows a cross-sectional side view of a portion of the infant car seat of FIG. 1 with a first car seat anchor in a fourth extended position.
FIG. 7F shows a cross-sectional side view of a portion of the infant car seat of FIG. 1 with a first car seat anchor in a fifth extended position.

Turning now to FIGS. 7A to 7F, a range of motion of each of the first car seat anchor 202 and the foot 206 is shown. It will be understood that the range of motion of the second car seat anchor 204 can be substantially identical to the range of motion of the first car seat anchor 202. In FIG. 7A, the first car seat anchor 202 is shown in the retracted position, and the foot 206 is shown in the stowed position. Note that, in FIG. 7A, only the second end 202b of the first car seat anchor 202 is visible as most of the first car seat anchor 202 is disposed behind the first rail 120. In FIGS. 7B to 7F, the first car seat anchor 202 is shown in a plurality of different extended positions. The first and second car seat anchors 202 and 204 can be movable between different extended positions to account for variations in the position of the vehicle anchors 302 from one vehicle to another.

Each car seat anchor 202 and 204 is configured to move from the retracted position in FIG. 7A to each extended position, where the anchor axis $A_A$ in each extended position is offset from the anchor axis $A_A$ in the retracted position by an angle $\alpha$. FIGS. 7B to 7F show five different extended positions, where the angle $\alpha$ is increased in each successive figure. The at least one foot 206 is configured to move from the stowed position in FIG. 7A to at least one deployed position, wherein the at least one foot 206 engages the seat pan 306 of the vehicle seat 300. Movement of one or both of the first and second car seat anchors 202 and 204 causes the at least one foot 206 to move relative to one or both of the first and second car seat anchors 202 and 204. However, the infant car seat 10 is configured such that movement of one or both of the first and second car seat anchors 202 and 204 does not cause an equal movement of the foot 206.

The first and second car seat anchors 202 and 204 can follow a first trajectory or path as they transition from the retracted position towards the at least one extended position. The at least one foot 206 can follow a second trajectory or path as the at least one foot 206 transitions from the stowed position to the at least one deployed position. The first and second trajectories or paths can be different from one another as illustrated in FIGS. 7A to 7F. The first and second trajectories or paths can follow different arcs. The first and second trajectories or paths can have different lengths. The free ends 202b and 204b of the first and second car seat anchors 202 and 204 can move a first distance from the retracted position to a furthest-most one of the at least one extended position, and the free end of the at least one foot 206 can move a second distance from the stowed position to a furthest-most one of the at least one deployed position, the second distance being less than the first distance. In some examples, any movement of the first and second car seat anchors 202 and 204 causes at least some movement of the at least one foot 206, even if that movement is relatively small. In other words, in such examples, the at least one foot 206 moves during a full range of movement of the first and second car seat anchors 202 and 204. In other examples, the at least one foot 206 does not move over a full range of movement of the first and second car seat anchors 202 and 204. In other examples, the at least one foot 206' does not move over a full range of movement of the first and second car seat anchors 202' and 204'.

As can be seen in FIGS. 7A to 7F, movement of one or both of the first and second car seat anchors 202 and 204 from the position in FIG. 7A to the position in FIG. 7D causes the at least one foot 206 to move a first distance. Further movement of one or both of the first and second car seat anchors 202 and 204 from the position in FIG. 7D to the position in FIG. 7F causes the at least one foot 206 to either remain stationary or move a second distance, less than the first distance. Thus, the infant car seat 10 is configured such that movement of one or both of the first and second car seat anchors 202 and 204 from the position in FIG. 7D to the position in FIG. 7F causes very little, if any, movement of the at least one foot 206. FIGS. 7D to 7F show a preferred position (or positions) of the at least one foot 206 when the infant car seat 10 is installed properly on the vehicle seat 300. The relative movement between the at least one foot 206 and one or both of the first and second car seat anchors 202 and 204 allows the at least one foot 206 to be positioned properly against the seat pan 306 of the vehicle seat 300 for a range of different angles of one or both of the first and second car seat anchors 202 and 204. In some examples, movement of the anchor axis $A_A$ of each car seat anchor 202 and 204 of up to 45 degrees from the position shown in FIG. 7D to the position shown in FIG. 7F can result in the at least one foot 206 moving less than about 1 cm, and in some examples less than about 5 mm or less than about 3 mm.

The infant car seat 10 can be configured such that, when one or both of the first and second car seat anchors 202 and 204 moves to a first one of the extended positions, the at least one foot 206 can move a first distance, and when one or both of the first and second car seat anchors 202 and 204 moves from the first one of the extended positions to a second one of the extended positions, the at least one foot 206 can move a second distance, less than the first distance, or does not move at all. The second distance can be less than about 1 cm, and in some examples less than about 5 mm or less than about 3 mm. The first distance can be significantly greater than 1 cm. Additionally, or alternatively, the infant car seat 10 can be configured such that one or both of the first and second car seat anchors 202 and 204 moves a first distance from a first position (e.g., the retracted position) to a second position (e.g., a further-most extended position), and the at least one foot 206 moves a second distance (e.g., from the stowed position to the at least one deployed position) less than the first distance.

When the at least one foot 206 is in the at least one deployed position, the first axis of rotation $A_{R1}$, the second Axis of rotation $A_{R2}$, and the pivot axis A P can be substantially aligned as shown in FIG. 7E. When these three axes are substantially aligned, each linkage 214 can form a substantially rigid structure that can limit, or prevent altogether, movement of the at least one foot 206 towards the car seat body 100 as the at least one foot 206 is compressed against the seat pan 306 of the vehicle seat 300. In other words, when these three axes are substantially aligned, each linkage 214 forms a substantially rigid structure applies a force to the at least one foot 206 that is substantially equal and opposite of a force applied by the vehicle seat pan 306 to the at least one foot 206.

Turning to FIGS. 8 to 11, an infant car seat 10' is shown according to another example. The infant car seat 10' comprises a car seat body 100 and can comprise a handle 126, both of which can be configured as discussed above in relation to FIGS. 1 to 7*f*. It will be understood that the features of FIGS. 8 to 19 having like reference numerals to those of FIGS. 1 to 7*f* may be understood with reference to the descriptions of those features above in relation to FIGS. 1 to 7*f*. Although not shown, the infant car seat 10' can comprise soft goods disposed within the recess 106 that is configured to provide cushioning to the infant. The infant car seat 10' comprises an anchoring assembly 200' having first and second car seat anchors 202' and 204', and at least one retractable foot 206'. The first and second car seat anchors 202' and 204' can be configured in a manner similar to that described above in relation to first and second car seat anchors 202 and 204 of FIGS. 1 to 7F. However, as discussed below, the first and second car seat anchors 202' and 204' can be transitioned between a locked state and an unlocked state by an actuator 124 (labeled in FIG. 10) that is separate from, and spaced from, the first and second car seat anchors 202' and 204'. This is in contrast to the first and second car seat anchors 202 and 204, each of which comprises an actuator 205 (labeled in FIG. 5). The at least one retractable foot 206' can be configured in a manner that is different from the at least one retractable foot 206 of FIGS. 1 to 7F, and can be configured to rotate is a direction that is opposite from the direction in which the first and second car seat anchors 202' and 204' rotate.

Figures 12, 13:
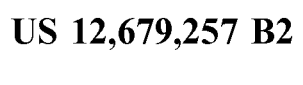
FIG. 12 shows a perspective view of a portion of the infant car seat of FIG. 8, with an anchoring assembly of the infant car seat partially exploded.
FIG. 13 shows a perspective view of the anchoring assembly of the infant car set of FIG. 8.
Figures 14A, 14B, 14C, 14D:
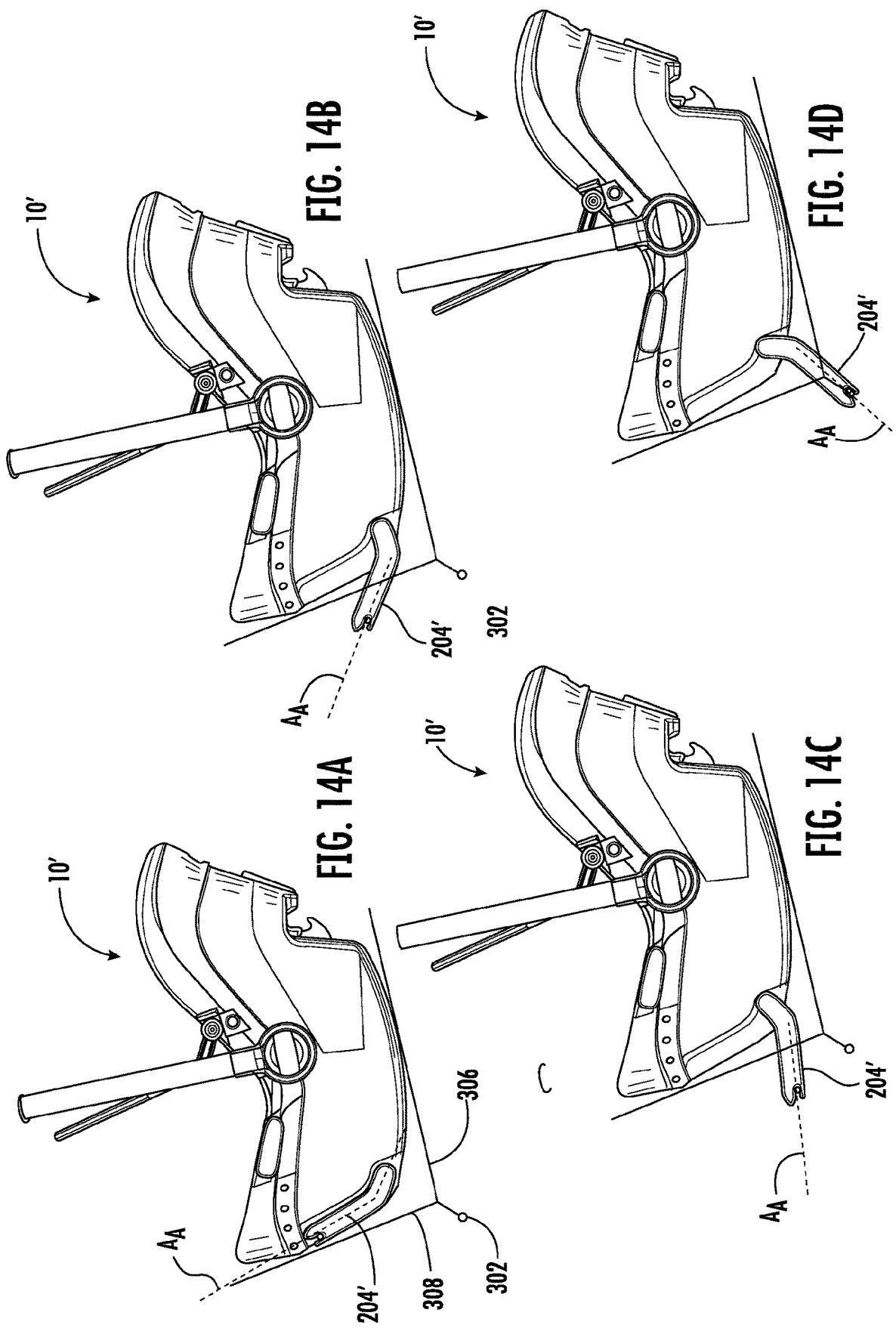
FIG. 14A shows a cross-sectional side view of a portion of the infant car seat of FIG. 8 with a car seat anchor in a retracted position and a foot in a stowed position.
FIG. 14B shows a cross-sectional side view of a portion of the infant car seat of FIG. 8 with a car seat anchor in a first extended position.
FIG. 14C shows a cross-sectional side view of a portion of the infant car seat of FIG. 8 with a car seat anchor in a second extended position.
FIG. 14D shows a cross-sectional side view of a portion of the infant car seat of FIG. 8 with a car seat anchor in a third extended position.

Referring to FIGS. 12 and 13, the anchoring assembly 200' and the car seat body 100 are coupled to one another such that the anchoring assembly 200' is movable relative to the car seat body 100. More specifically, the anchoring assembly 200' and the car seat body 100 are coupled to one another such that each of the first and second car seat anchors 202' and 204' are moveable between a retracted position (shown in FIGS. 9 and 14A) and at least one extended position (shown in FIGS. 1 and 14B to 14D). The first and second car seat anchors 202' and 204' are coupled to the car seat body 100 adjacent to the front end 112, such as between (1) the handle couplers 128 and 130 and (2) the front end 112. In some examples, the first and second car seat anchors 202' and 204' are each movable between the retracted position and a plurality of extended positions (e.g., as shown in FIGS. 14B to 14D). In each extended position, a 202*b*, 204*b* free end of each of the first and second car seat anchors 202' and 204' extends beyond the front end 112 of the car seat body 100. In at least some of the extended positions, a free end 202*b*, 204*b* of each of the first and second car seat anchors 202' and 204' extends beyond the bottom surface 110 of the car seat body 100. Each car seat anchor 202' and 204' can be moved to a select one of the extended positions that corresponds to a position of one of the first and second vehicle anchors 302 of the vehicle seat 300.

In the retracted position, the free ends 202*b*, 204*b* of each of the first and second car seat anchors 202' and 204' extends beyond one or both of the front end 112 and the bottom surface 110 less than when the first or second car seat anchor 202' and 204' is in one of the extended positions, and in some examples, does not extend beyond one or both of the front end 112 and the bottom surface 110. In other words, the free end 202*b*, 204*b*, of each of the car seat anchors 202' and 204' is closer to the car seat body 100 in the retracted position than in the extended position or positions. In embodiments that implement the first and second pockets 132 and 134, the first and second car seat anchors 202' and 204' can be received in the first and second pockets 132 and 134, respectively, when in the retracted position.

The first and second car seat anchors 202' and 204' can be coupled to the car seat body 100 in any suitable manner such that the first and second car seat anchors 202' and 204' are movable between the at least one extended position and the retracted position. In various examples, the first and second car seat anchors 202' and 204' can be configured to rotate and/or translate and/or telescope and/or move in any other suitable manner. FIGS. 8 to 14 show one example manner of coupling the first and second car seat anchors 202' and 204' to the car seat body 100. In this example, the first and second car seat anchors 202' and 204' are each configured to rotate about a first axis of rotation $A_{R1}$. The first and second car seat anchors 202' and 204' have free ends 202*b* and 204*b*, respectively, that are each configured to rotate away from the front end 112 and downward (i.e., counterclockwise as viewed along a direction from a left-hand side to a right-hand side of the seat 10', where the left-hand side is adjacent the child's left arm) as they transition from the retracted position towards the at least one extended position. The free ends 202*b* and 204*b* are each configured to rotate towards the front end 112 and upwards (i.e., clockwise as viewed along a direction from a left-hand side to a right-hand side of the seat 10', where the left-hand side is adjacent child's left arm) as they transition from the at least one extended position towards the retracted position.

Similar to the anchoring assembly 200 of FIGS. 1-7F, the anchoring assembly 200' can comprise at least one shaft 208 that couples the anchoring assembly 200' to the seat body 100. Although one shaft 208 is shown, it will be understood that the anchoring assembly 200 could alternatively comprise a separate shaft for each of the first and second car seat anchors 202 and 204. The at least one shaft 208 can extend between the first and second car seat anchors 202' and 204'. Further, the car seat body 100 can define at least one opening 136, 138 that is configured to receive the at least one shaft 208 of the anchoring assembly 200' such that the at least one shaft 208 is rotatable within the at least one opening 136, 138. The at least one opening can comprise a first opening 136 and a second opening 138 that are spaced from one another along the third direction $D_3$. The shaft 208 and/or the first and second openings 136 and 138 can define the first axis of rotation $A_{R1}$. The first opening 136 can be disposed at the first sidewall 116 of the car seat body 100 and the second opening 138 can be disposed at the second sidewall 118 of the car seat body 100. In example infant car seats that include rails 120 and 122, the first and second openings 136 and 138 can extend entirely through the first and second rails 120 and 122, respectively.

The shaft 208 can be received through the first and second openings 136 and 138 such that first car seat anchor 202' is disposed outwardly from the first opening 136 along the third direction $D_3$ and the second car seat anchor 204' is disposed outwardly from the second opening 138 along the third direction $D_3$. Thus, the car seat body 100 can be disposed between the first and second car seat anchors 202' and 204'. It will be understood, however, that the first and second car seat anchors 202' and 204' could alternatively be disposed inwardly from the first and second openings 136 and 138, respectively.

The shaft 208 is rotationally fixed to the first and second seat anchors 202' and 204'. In other words, the shaft 208 is coupled to the first and second seat anchors 202' and 204' such that rotation of the shaft 208 causes a corresponding rotation of the first and second seat anchors 202' and 204', and vice versa. The first seat anchor 202' can comprise a first end 202a and a second end 202b. The first seat anchor 202' can comprise an inner surface 202c and an outer surface 202d that are offset from one another along the third direction $D_3$. The first seat anchor 202' can be elongate from the first end 202a to the second end 202b. The first seat anchor 202' can extend along an anchor axis $A_4$ from the first end 202a to the second end 202b. The anchor axis $A_4$ (labeled in FIGS. 14A to 14D) can be bent as shown or can be curved or straight. The anchor axis $A_4$ can be bent at an angle that is between 0 degrees and 90 degrees, such as at an angle between 10 degrees and 80 degrees, such as at an angle between 20 degrees and 70 degrees, such as at an angle that is between 30 degrees and 60 degrees.

The first end 202a can be coupled to the shaft 208. The second end 202b can be a free end that is not attached to the car seat body 100. In some examples, the first end 202a can be recessed inward relative to the second end 202b. For instance, the first seat anchor 202 can define a shoulder 202e between the first end 202a and the second end 202b along the outer surface 202d. The shoulder 202e can define a support surface for supporting the infant car seat 10 on an infant car seat ring of a stroller as described below in relation to FIGS. 23 and 24. The second end 202b can comprise a latch (discussed below) that is configured to releasably lock to the first vehicle anchor 302. The latch can be actuated by an actuator 124 (labeled in FIG. 10) that is spaced from, and separate from, the first car seat anchor 202'.

Similarly, the second seat anchor 204' can comprise a first end 204a and a second end 204b. The second seat anchor 204' can comprise an inner surface 204c and an outer surface 204d that are offset from one another along the third direction $D_3$. The inner surfaces 202c and 204c of the first and second car seat anchors 202' and 204' can be opposite one another so as to define a space 210 therebetween. The first seat anchor 204' can be elongate from the first end 204a to the second end 204b. The second seat anchor 204' can extend along an anchor axis $A_4$ from the first end 204a to the second end 204b. The anchor axis $A_4$ can be bent as shown or can be curved or straight. The anchor axis $A_4$ can be bent at an angle that is between 0 degrees and 90 degrees, such as at an angle between 10 degrees and 80 degrees, such as at an angle between 20 degrees and 70 degrees, such as at an angle that is between 30 degrees and 60 degrees.

The first end 204a can be coupled to the shaft 208. The second end 204b can be a free end that is not attached to the car seat body 100. The second end 204b can comprise a latch that is configured to releasably lock to the second vehicle anchor 302. In some examples, the first end 204a can be recessed inward relative to the second end 204b. For instance, the second seat anchor 204 can define a shoulder 204e between the first end 204a and the second end 204b along the outer surface 204d. The shoulder 204e can define a support surface for supporting the infant car seat 10 with an infant car seat ring of a stroller as described below in relation to FIGS. 23 and 24. The latch can be actuated by an actuator 124 (labeled in FIG. 10) that is spaced from, and separate from, the first car seat anchor 202'.

Figure 9:
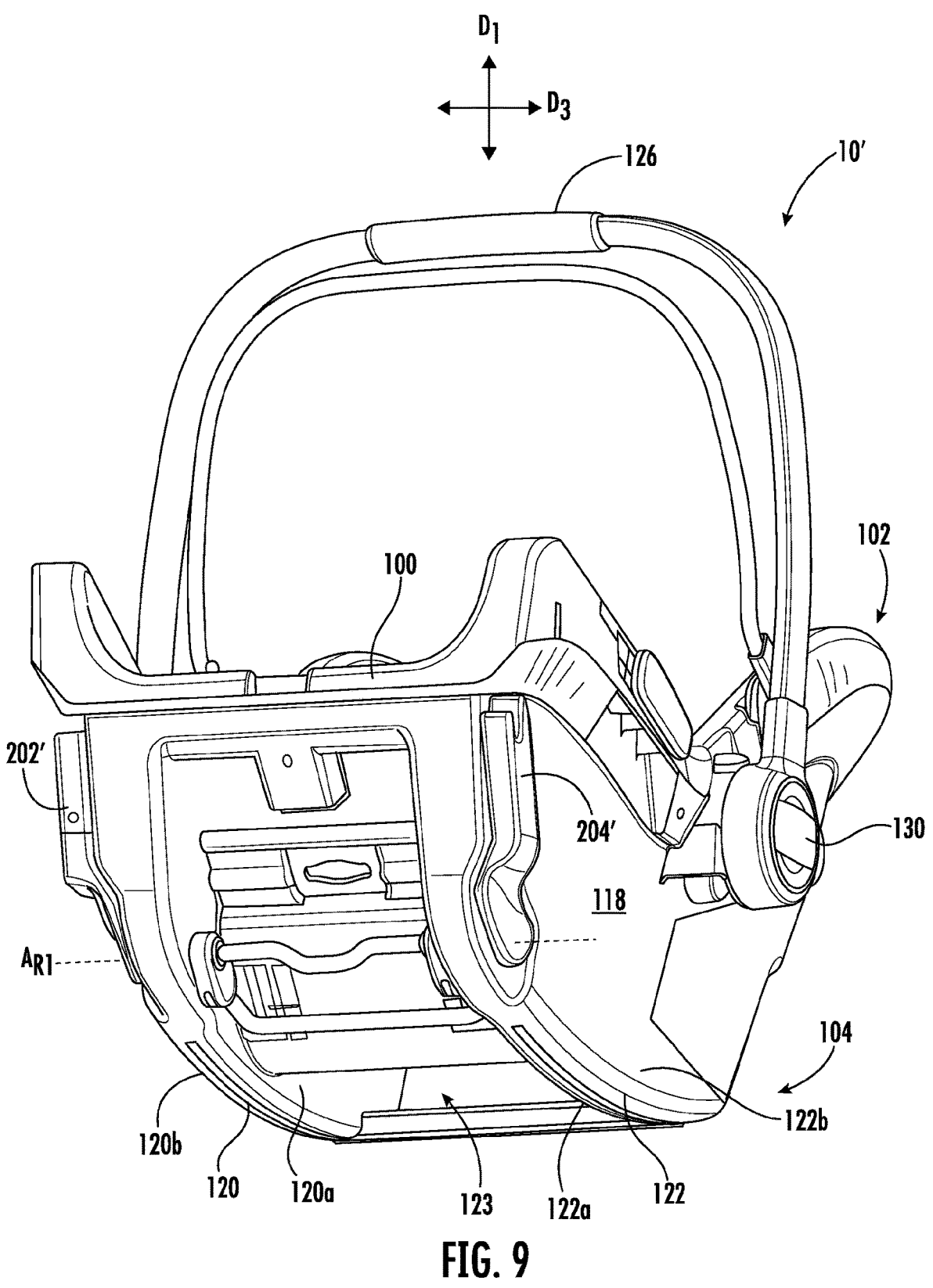
FIG. 9 shows a bottom, front perspective view of the infant car seat of FIG. 8.

With continued reference to FIGS. 12 and 13, the at least one foot 206' is coupled to the car seat body 100 such that the at least one foot 206' is movable between at least one deployed position (shown in FIG. 8) and a stowed position (shown in FIG. 9). In the at least one deployed position, the at least one foot 206' is positioned to engage a seat pan 306 (shown in FIG. 4) of the vehicle seat so as to limit, or prevent altogether, rotation of the front end 112 of the infant car seat 10 towards the seat pan 306. Further, in the at least one deployed position, the at least one foot 206' extends beyond one or both of the bottom surface 110 and the front end 112. In the stowed position, the at least one foot 206' extends beyond one or both of the front end 112 and the bottom surface 110 less than when the at least one foot 206' is in the at least one deployed position, and in some examples, does not extend beyond one or both of the front end 112 and the bottom surface 110 at all. As discussed above, in example infant car seats having first and second rails 120 and 122, the at least one foot 206' can be positioned between the first and second rails 120 and 122 when the at least one foot 206' is in the stowed position.

The at least one foot 206' is coupled to at least one of the first and second car seat anchors 202' and 204' such that movement of one or both of the first and second car seat anchors 202' and 204' causes the at least one foot 206' to move relative to both 1) the car seat body 100 and 2) one or both of the first and second car seat anchors 202' and 204'. As will be described further below, movement of one or both of the first and second car seat anchors 202' and 204' causes a movement of the at least one foot 206' that is different from the movement of one or both of the first and second car seat anchors 202' and 204'. The at least one foot 206' can be spaced inwardly from the inner surfaces 202c and 204c of the first and second anchors 202' and 204' such that the at least one foot 206' is not in contact with the first and second anchors 202' and 204'. In some examples, the at least one foot 206' can be configured to move into and out of the space 210 between the first and second car seat anchors 202' and 204'.

In various examples, the at least one foot 206' can be configured to rotate and/or translate and/or telescope and/or move in any other suitable manner. The figures show one example manner of coupling the at least one foot 206' to the car seat body 100. In this example, the at least one foot 206' is configured to rotate about the first axis of rotation $A_{R1}$. The at least one foot 206' has a free end 206b that is configured to rotate downward from the stowed position and towards from the front end 112 (i.e., clockwise as viewed along a direction from a left-hand side to a right-hand side of the seat 10', where the left-hand side is adjacent the child's left arm) as the at least one foot 206' transitions from the stowed position towards the at least one deployed position. Thus, the at least one foot 206' is configured to rotate from the stowed position towards the at least one deployed position in a direction that is opposite from that of the at least one foot 206 of FIGS. 10 to 7F. The free end 206b is configured to rotate away from the front end 112 and upwards (i.e., counterclockwise as viewed along a direction from a left-hand side to a right-hand side of the seat 10', where the left-hand side is adjacent the child's left arm) as it transitions from the at least one deployed position towards the stowed position.

The at least one foot 206' can have a first end 206a that is coupled to the car seat body 100, and a second end 206b, opposite the first end 206a. The second end 206b is a free end that is free from attachment to the car seat body 100. In some examples, the at least one foot 206' can comprise a tube that is formed to have a "u" shape with the bottom of the "u" shape defining the free end 206b, although it will be understood that the at least one foot 206' can have any other suitable shape. The first end 206a can be rotationally coupled to the lower end 104 of the car seat body 100. For example, the first end 206a can be coupled to the car seat body 100 by the at least one shaft 208. The at least one foot 206' can be configured to pivot about the first axis of rotation $A_{R1}$ between the at least one deployed position and the stowed position. Rotation of the first and second car seat anchors 202' and 204', and consequently the at least one shaft 208, can cause rotation of the at least one foot 206'. However, the at least one foot 206' can be configured to rotate at a different rate and/or along a different direction than the at least one shaft 208 and the first and second car seat anchors 202' and 204'. Thus, a rotational motion of the at least one foot 206' can be different from a rotational motion of the at least one shaft 208 and the first and second car seat anchors 202' and 204'. In some examples, the anchoring assembly 200' can comprise gears that cause the rotation of the foot 206' to be different from that of the at least one shaft 208 and the first and second car seat anchors 202' and 204'.

For example, the anchoring assembly 200' can comprise at least one pair of gears, such as two pairs of gears that are offset from one another along the third direction $D_3$. Each pair of gears can comprise a driver gear 220 that is rotationally fixed to the at least one shaft 208 or one of the first and second car seat anchors 202' and 204' such that rotation thereof causes a corresponding rotation of the driver gear 220. Each pair of gears can comprise a driven gear 222 having teeth that engage the teeth of the driver gear 220. The driven gear 222 can be rotationally fixed to the at least one foot 206' such that rotation of the driven gear 222 causes a corresponding rotation of the at least one foot 206'. In some examples, the driven gear 222 can have a larger diameter and a greater number of teeth than the driver gear 220. As a result, the driver gear 220 can drive the driven gear 222 to rotate at a slower rate than the driver gear 220. Each pair of first and second gears 220 and 222 can be housed in a gear housing 224. In other examples, the driven gear 222 can have the same or smaller diameter and the same or smaller number of teeth than the driver gear 220.

Although the figures show one example of an infant car seat having a single foot 206', it will be understood that, in alternative examples, an infant car seat can have more than one foot. For example, an infant car seat can have first and second feet that are offset from one another along the third direction $D_3$. A first one of the feet can be coupled to the first car seat anchor 202' such that movement of first car seat anchor 202' causes the first foot to move relative to the first car seat anchor 202', and a second one of the feet can be coupled to the second car seat anchor 204' such that movement of second car seat anchor 204' causes the second foot to move relative to the second car seat anchor 204'.

Turning now to FIGS. 14A to 14D, a range of motion of each of the second car seat anchor 204' and the foot 206' is shown. It will be understood that the range of motion of the first car seat anchor 202' can be substantially identical to the range of motion of the second car seat anchor 204'. In FIG. 14A, the second car seat anchor 204' is shown in the retracted position, and the foot 206' is shown in the stowed position. In FIGS. 14B to 14D, the second car seat anchor 204' is shown in a plurality of different extended positions. The first and second car seat anchors 202' and 204' can be movable between different extended positions to account for variations in the position of the vehicle anchors 302 from one vehicle to another.

Each car seat anchor 202' and 204' is configured to move from the retracted position in FIG. 14A to each extended position, where the anchor axis $A_A$ in each extended position is offset from the anchor axis $A_A$ in the retracted position by an angle α. FIGS. 14B to 14D show three different extended positions, where the angle α is increased in each successive figure. The at least one foot 206' is configured to move from the stowed position in FIG. 14A to an extended position, wherein the at least one foot 206' engages the seat pan 306 of the vehicle seat 300. Movement of one or both of the first and second car seat anchors 202' and 204' causes the at least one foot 206' to move relative to one or both of the first and second car seat anchors 202' and 204'. However, the infant car seat 10' is configured such that movement of one or both of the first and second car seat anchors 202' and 204' does not cause an equal movement of the foot 206'. In some examples, any movement of the first and second car seat anchors 202' and 204' causes at least some movement of the at least one foot 206', even if that movement is relatively small. In other words, in such examples, the at least one foot 206' moves during a full range of movement of the first and second car seat anchors 202' and 204'.

The first and second car seat anchors 202' and 204' can follow a first trajectory or path as they transition from the retracted position towards the at least one extended position. The at least one foot 206' can follow a second trajectory or path as the at least one foot 206' transitions from the stowed position to the at least one deployed position. The first and second trajectories or paths can be different from one another as illustrated in FIGS. 14A to 14D. The first and second trajectories or paths can follow different arcs. The first and second trajectories or paths can have different lengths. In some examples, the first and second car seat anchors 202' and 204' can move in a direction that is opposite from the direction in which the at least one foot 206' moves. The free ends 202b and 204b of the first and second car seat anchors 202' and 204' can move a first distance from the retracted position to a furthest-most one of the at least one extended position, and the free end of the at least one foot 206' can move a second distance from the stowed position to a furthest-most one of the at least one deployed position, the second distance being less than the first distance.

As can be seen in FIGS. 14A to 14D, the at least one foot 206' moves relative to both the first and second car seat anchors 202' and 204' and the seat body 100. The relative movement between the at least one foot 206' and one or both of the first and second car seat anchors 202' and 204' allows the at least one foot 206' to be positioned properly against the seat pan 306 of the vehicle seat 300 when the first and second car seat anchors 202' and 204' are moved to the at least one extended position.

Figure 15:
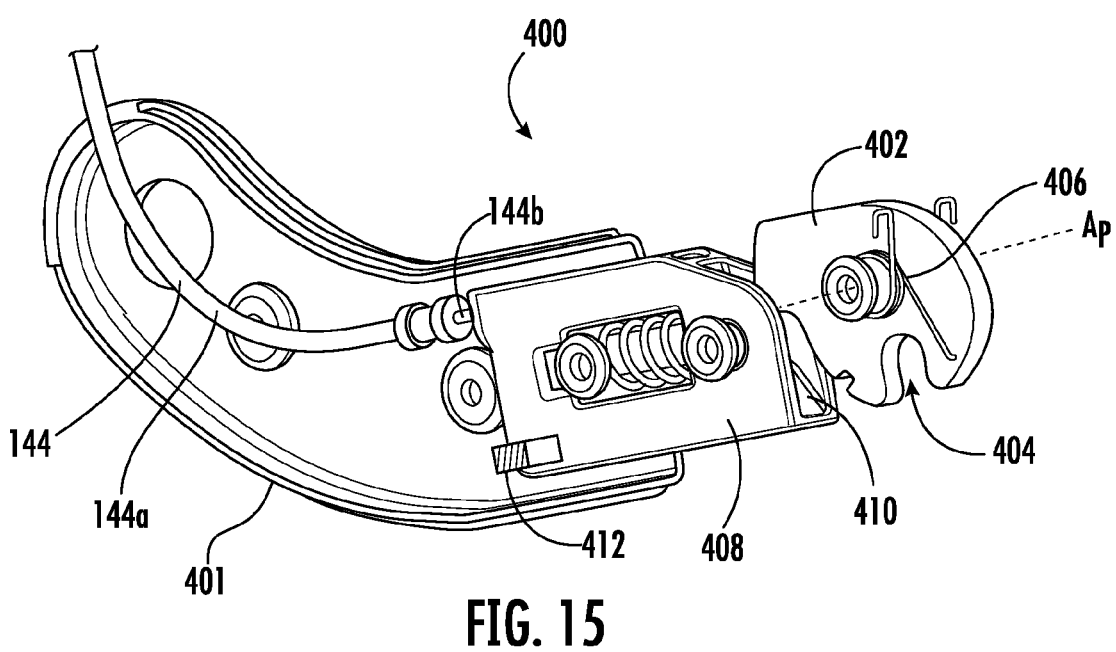
FIG. 15 shows a perspective view of one of the car seat anchors of the infant car seat of FIG. 8 with a cover removed.
Figure 16:
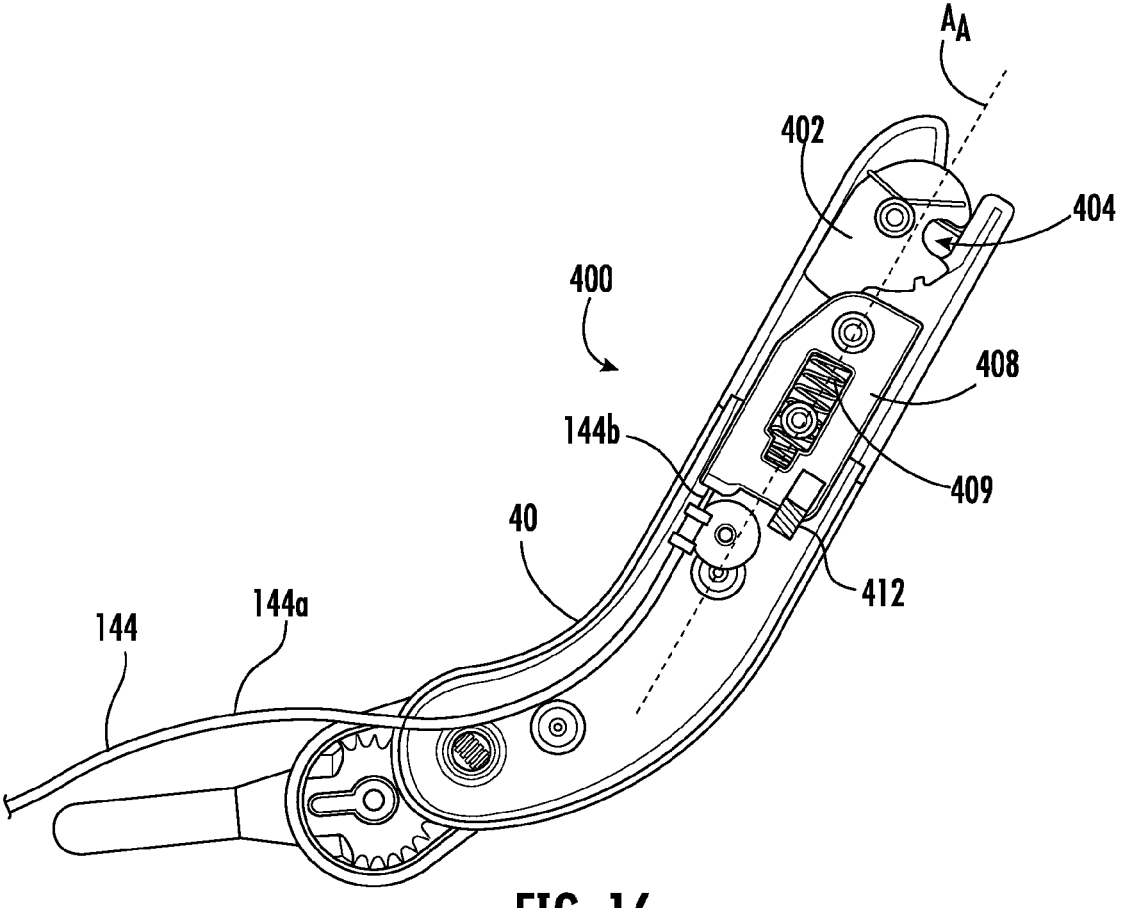
FIG. 16 shows a side view of the car seat anchor of FIG. 15 with the cover removed.

Turning now to FIGS. 15 and 16, an example of a car seat anchor 400 that may be used to implement one or both of the car seat anchors 202' and 204' is shown. The car seat anchor 400 comprises a housing 401 and a latch 402 disposed in the housing 401. The latch 402 defines a recess 404 therein that is configured to receive a vehicle anchor 302 (see FIG. 11) disposed at a bight 304 (see FIG. 11) of the vehicle seat 300 (see FIG. 11). The latch 402 can be a plate defining the recess 404. The latch 402 can be formed from metal or other suitable rigid material. The latch 402 can be pivotable relative to the housing 401 about a pivot axis $A_P$. The pivot axis $A_P$ can extend along the third direction $D_3$. The latch 402 can be configured to pivot in a first direction towards the locked state so as to receive the vehicle anchor 302 and in a second direction to an unlocked state so as to withdraw from engagement with the vehicle anchor 302. The car seat anchor 400 can comprise at least one biasing member 406 that is configured to bias the latch 402 towards the unlocked state. The biasing member 406 can be a spring, resilient material, flexible finger, or other suitable biasing member. The spring 406 can be disposed about the pivot axis $A_P$, although the spring can be otherwise disposed.

The car seat anchor 400 can comprise a shuttle 408 that is configured to engage the latch 402 and translate relative to the latch 402 to cause the latch 402 to transition between the locked and unlocked states. The shuttle 408 can be configured to translate relative to the housing 401 and the latch 402 along the axis $A_A$ of the car seat anchor 400. In one example, the shuttle 408 can have a ramped surface 410 that is configured to engage the latch 402 so that the latch 402 slides along the ramped surface 410, thereby causing the latch 402 to transition from the locked state to the unlocked state. The car seat anchor 400 can comprise at least one biasing member 409 that is configured to bias the shuttle 408 towards the locked state. The biasing member 406 can be a spring, resilient material, flexible finger, or other suitable biasing member.

The shuttle 408 can be actuated (e.g., moved) by at least one link 144 of the actuator 124. Each of the at least one link 144 can comprise a cable as shown, or a band, a rod, a bar, or any other suitable link. The cable can comprise a sleeve 144a and a wire 144b that is translatable within the sleeve 144a. The wire 144b can be attached to the anchor 400 such that movement of the wire 144b causes movement of the latch 402. A portion of the sleeve 144a can be positionally fixed relative to the housing 401 of the anchor 400 so as to allow the wire 144b to move within the sleeve 144a. The cable can be routed through the car seat body 100 to the car seat anchor 400. It will be understood that the latch 402 can be configured in another suitable manner.

In some examples, the car seat anchor 400 can comprise an indicator that is configured to indicate whether the car seat anchor 400 is in the locked or unlocked state. The indicator can give a visible, audible, or tactile indication that the car seat anchor 400 is in the locked or unlocked state. The indicator can display a first indicia when the anchor 400 is in the unlocked state and a second indicia, different from the first indicia, when the anchor 400 is in the locked state. For example, the car seat anchor 400 can comprise a visual indicator 412 having a first indicia to indicate that the anchor 400 is in the unlocked state, and a second indicia to indicate that the anchor 400 is in the locked state. In some examples, the first indicia can be a first color (e.g., red), and the second indicia can be a second color (e.g., green), different from the first color. The indicator 412 can be disposed on the shuttle 408 (as shown in FIGS. 15 and 16) or the latch 402, and the housing 401 of the anchor 400 can define a window 414 as shown in FIG. 17 through which the indicator 412 can be viewed.

Figure 10:
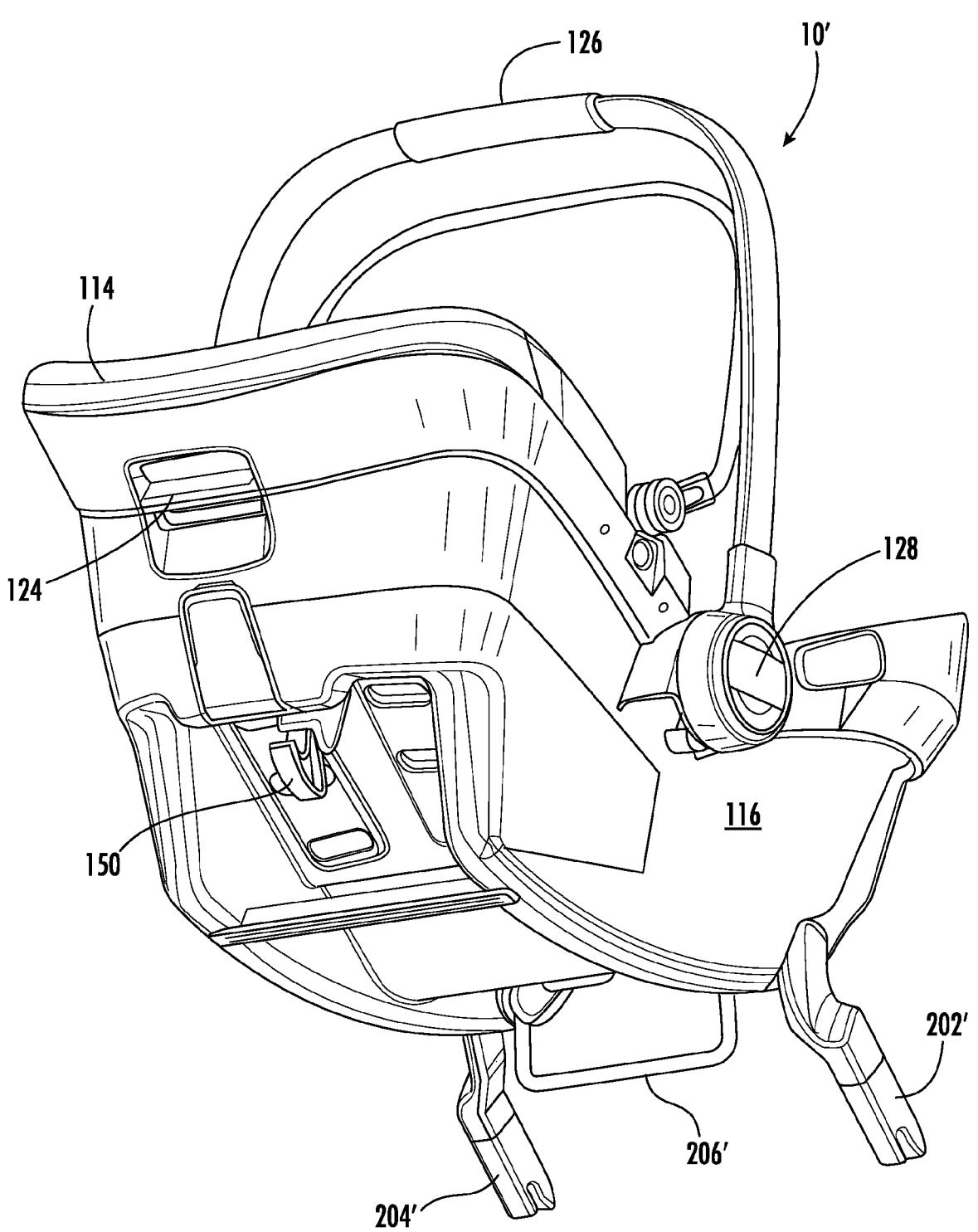
FIG. 10 shows a bottom, rear perspective view of the infant car seat of FIG. 8.
Figures 17, 18:
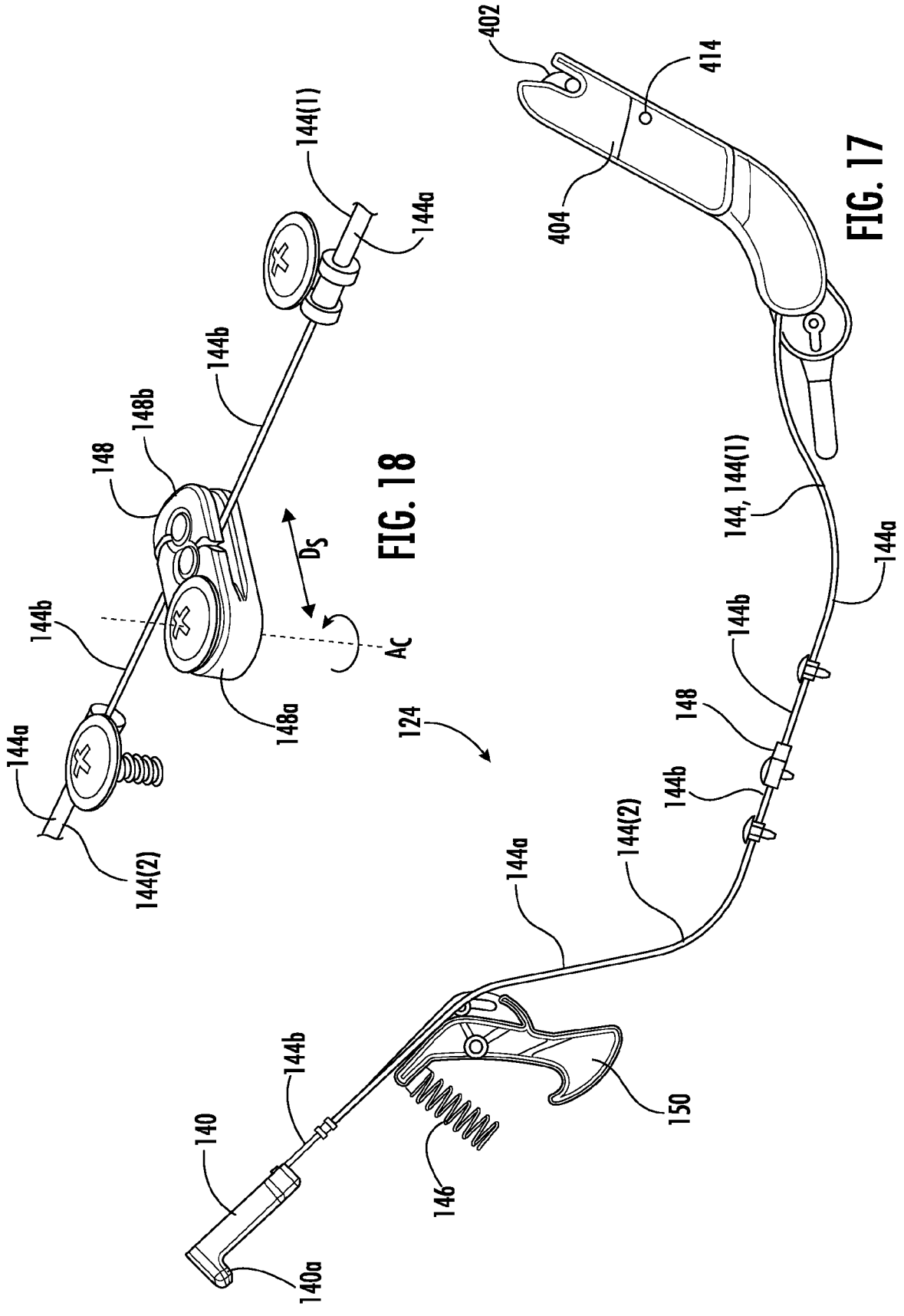
FIG. 17 shows a side view of an actuator of the infant car seat of FIG. 8 attached to one of the car seat anchors.
FIG. 18 shows a perspective view of a coupler of the actuator of FIG. 17.
Figure 19:
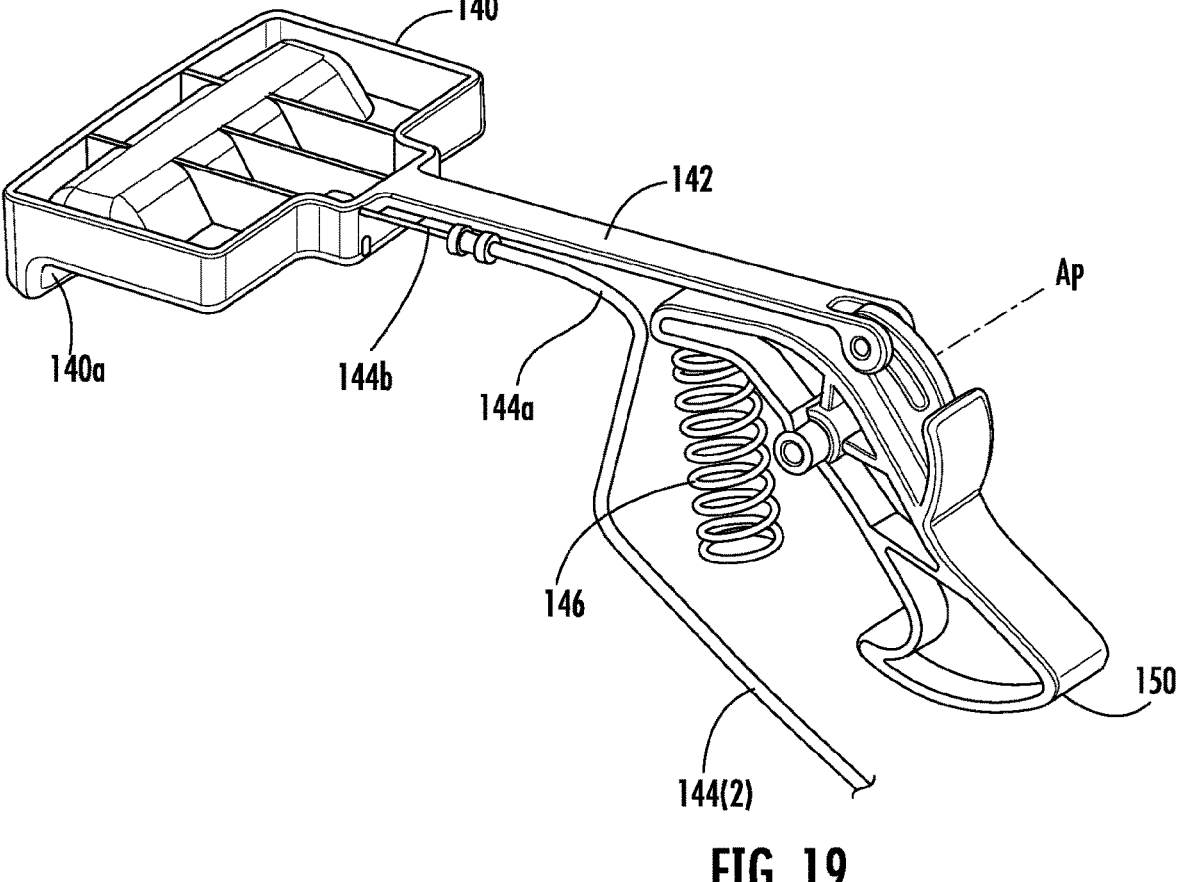
FIG. 19 shows a perspective view of a portion of the actuator of FIG. 17 that includes an actuation handle and a releasable hook.

With reference to FIGS. 17 to 19, the infant car seat 10' can comprise an actuator 124 that is configured to transition the latch 402 between the locked and unlocked states. The actuator 124 can comprise an actuation surface 140a that is configured engaged by a caregiver to actuate the actuator 124. In one example, the actuation surface 140a can be formed on a handle 140. The handle 140 can be disposed adjacent the back end 114 of the car seat body 100 on an underside of the seat back 108a as shown in FIG. 10. In alternative examples, the actuation surface 140a can be defined in another location such as on the handle 126. Further, in alternative examples, the actuation surface 140a can be defined by a push button (not shown).

The infant car seat 10' can comprise at least one second latch 150 that is configured to engage a frame of a stand, or a child carriage such as a stroller, to couple the infant car seat 10' to the frame. The actuator 124 can be configured to actuate both (1) the latches 402 of each of the first and second car seat anchors 202' and 204' and (2) the at least one second latch 150. The actuator 124 can comprise a link 142 that extends between the actuation surface 140a and the at least one second latch 150. The link 142 can be configured to cause the at least one second latch 150 to move between a latched position and an unlatched position when the actuation surface 140a is moved by a caregiver. The link 142 can be a band as shown, or can be a cable, a rod, a bar, or any other suitable component. The at least one second latch 150 can be biased towards the latched position.

FIGS. 17 to 19 show one example in which the at least one second latch 150 comprises a hook. The hook can extend downwards from the underside of the seat back 108a as shown in FIG. 10. The hook can be configured to pivot about a pivot axis $A_P$ that extends along the third direction $D_3$. The actuator 124 can comprise a biasing member 146, such as a spring or resilient material, that biases the hook towards the latched position. In this example, the actuator is configured such that, when the actuator is actuated, the link 142 moves a portion of the hook, thereby causing the hook to pivot from the latched position to the unlatched position about the pivot axis $A_P$. The actuator 124 can be configured to pull the link 142 as shown, or can be configured in alternative examples to push the link 142.

In other examples, the at least one second latch 150 can comprise at least one plunger (not shown), each configured to retractably extend from a respective one of the first and second sides 116 and 118 of the infant car seat 10'. In yet other examples, the at least one second latch 150 can comprise at least one plunger or hook (not shown), each disposed within a respective one of the first and second handle couplers 128 and 130 and configured to engage a bayonet of the frame when the bayonet is received in the respective one of the first and second handle couplers 128 and 130.

The actuator 124 can be configured such that a first amount of force and/or a first stroke length is needed to transition the latches 402 of each of the first and second car seat anchors 202' and 204' between the locked and unlocked states. Similarly, the actuator 124 can be configured such that a second amount of force and/or a second stroke length is needed to transition the at least one second latch 150 between the latched and unlatched positions. The first force can be different from the second force, and/or the first stroke length can be different from the second stroke length. Therefore, the actuator 124 can comprise a coupler 148 that is configured to reduce an amount of force and/or a stroke length needed to actuate one of (1) the latches 402 of each of the first and second car seat anchors 202' and 204' and (2) the at least one second latch 150.

In one example, the actuator 124 can comprise a first link 144(1) having a first end operatively connected to the latch 402 of the car seat anchor 400, and a second link 144(2) having a first end operatively coupled to the actuation surface 140*a*. The coupler 148 can couple the first link 144(1) and the second link 144(2) to one another. The coupler 148 can comprise a first end 148*a* and a second end 148*b* that are spaced from one another along a select direction $D_S$. The first end 148*a* can be pivotably coupled to the car seat body 100 such that the second end 148*b* of the coupler 148 is pivotable about a coupler pivot axis $A_C$ that is perpendicular to the select direction $D_S$. In such manner, the coupler 148 can function similar to a lever. The second end of the first link 144(1) and the second end of the second link 144(2) are attached to the coupler 148. The second ends of the first and second links 144(1) and 144(2) can be attached such that the end of the second end of the first link 144(1) is spaced between the coupler pivot axis $A_C$ and the second end of the second link 144(2) along the select direction $D_S$. The distance between the second ends of the first and second links 144(1) and 144(2) can be selected to achieve a desired amount of force and/or stroke length reduction.

Turning to FIGS. 20 to 22, in some examples, the actuator 124 (labeled in FIG. 17) can comprise an actuator lock 152 that is configured to prevent inadvertent actuation of the actuator 124. For instance, the actuator lock 152 can releasably lock the actuation surface 140*a* to prevent movement of the actuation surface 140*a* relative to the car seat body 100. The actuator lock 152 can be movable between a locked position (FIG. 21) that prevents the actuation surface 140*a* from being moved, and an unlocked position (FIG. 22) that allows the actuation surface 140*a* to be moved. In one example, the actuator lock 152 can define a movable protrusion, and the car seat body 100 can define an opening 154 that is configured to receive the actuator lock 152. The actuator lock 152 can be in the locked position when the actuator lock 152 is received in the opening 154 and in the unlocked position when the actuator lock 152 is removed from the opening 154. Note that, in FIG. 22, the actuation surface 152 is removed from the opening 154, and the actuation surface 140*a* is translated upwards relative to its position shown in FIG. 21. The actuator lock 152 can be received in the opening 154 along a direction that is angularly offset from (e.g., perpendicular to) the direction in which the actuation surface 140*a* moves when the actuator lock 152 is transitioned to the locked position.

Figures 23, 24:
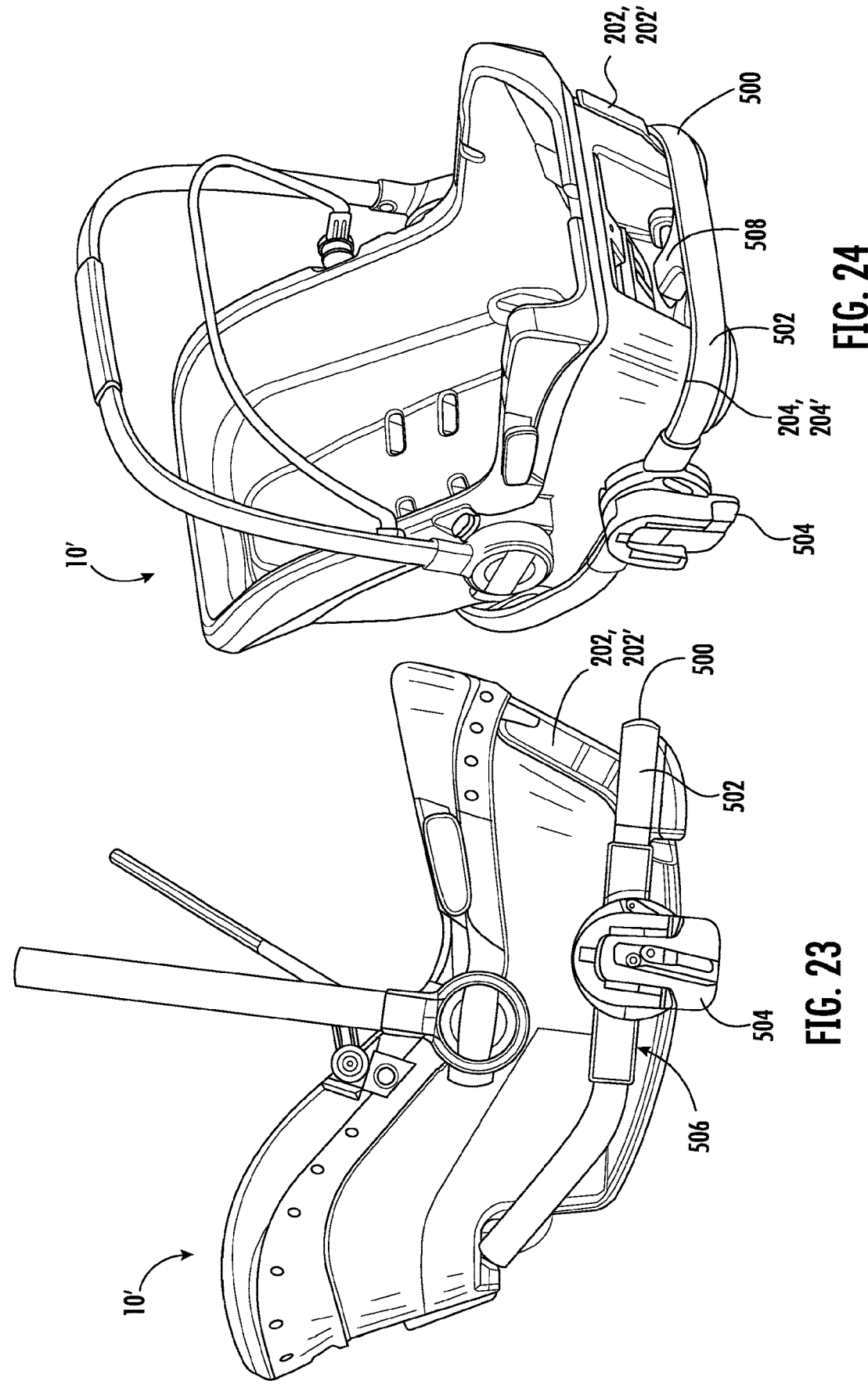
FIG. 23 shows a side view of an infant car seat supported by an infant car seat ring of a stroller according to one example.
FIG. 24 shows a perspective view of the infant car seat and infant car seat ring of FIG. 23.

Referring now to FIGS. 23 and 24, the infant car seat 10, 10' can be configured to be supported by an infant car seat ring 500 of a stroller (not shown). FIGS. 23 and 24 show one example, where the ring 500 is an adapter having a frame 502 and at least coupler 504 that is configured to removably couple the frame 502 to a frame of a stroller. In alternative examples, the ring 500 can be fixedly coupled to the frame of the stroller. The frame 502 can be formed from at least one tube or bar that surrounds an opening 506 to define a closed or partially closed shape around the opening 506. The opening 506 can be sized and shaped to receive and support the lower end 104 of the infant car seat 10, 10' such that the upper end 102 of the infant car seat 10, 10' rests above the frame 502. The opening 506 can conform to a shape of the lower end 104. Stated differently, the lower end 104 can be sized and shaped to be received in the opening 506 and can conform to a shape of the opening 506.

The first end 202*a* of the first car seat anchor 202, 202' and the first end 204*a* of the second car seat anchor 204, 204' can be recessed inwardly such that the first ends 202*a* and 204*a* are received within the opening 506 when the infant car seat 10, 10' is supported by the ring 500. The shoulders 202*e* and 204*e* of the first and second car seat anchors can be configured to rest against the frame 502 of the infant car seat ring 500 so as to limit an insertion distance of the infant car seat 10, 10' into the opening 506 of the ring 500. Thus, the ring 500 can support the infant car seat 10, 10' at the shoulders 202*e* and 204*e*.

In some examples, the ring 500 can comprise a protrusion 508 that extends from the frame 502 into the opening 506. The protrusion 508 can be configured to engage the at least one shaft 208 of the infant car sear 10, 10' so as to releasably lock the infant car seat 10, 10' to the ring 500. The protrusion 508 can engage the at least one shaft 208 between the shaft 208 and the car seat body 100 at a front end 112 of the infant car seat 10, 10'. The at least one second latch 150 at the back end 114 of the infant car seat 10, 10' can engage the frame 502 of the ring 500 so as to releasably lock the back end 114 of the infant car seat 10, 10' to the frame 502.

Referring now to FIGS. 25-31, various exemplary embodiments for retaining the car seat anchors 202, 202' and 204, 204' in the retracted position are illustrated. As used herein, "retaining" or being "retainable" via a retaining member can be defined as an applying or application of any type of physical influence on the anchors 202, 202' and 204, 204' that would maintain the anchors 202, 202' and 204, 204' in static retracted positions, bias the anchors 202, 202' and 204, 204' in a direction of their respective static positions, and/or counteract movement of the anchors 202, 202' and 204, 204' in a direction away from their respective retracted positions. As will be discussed with reference to exemplary retaining embodiments hereinbelow, the anchors 202, 202' and 204, 204' may be any of held, releasably locked, and/or biased in or towards their respective retracted positions via retaining members.

In FIGS. 25-31 only the first car seat anchor 202, 202' is illustrated. While second car seat anchor 204, 204' is not shown, it should be appreciated that anchor 204, 204' may be retained in the retracted position in the same manner as will be described with reference to anchor 202, 202' throughout the following paragraphs. In each of FIGS. 25-31, the car seat anchor is shown as being received in the pocket 132 when in the retracted position. However, configurations that are absent the pocket(s) 132 are contemplated herein. In such configurations the car seat anchor 202, 202' would be positioned in the retracted position when merely drawn into contact with a surface of the car seat body 100.

Figure 25:
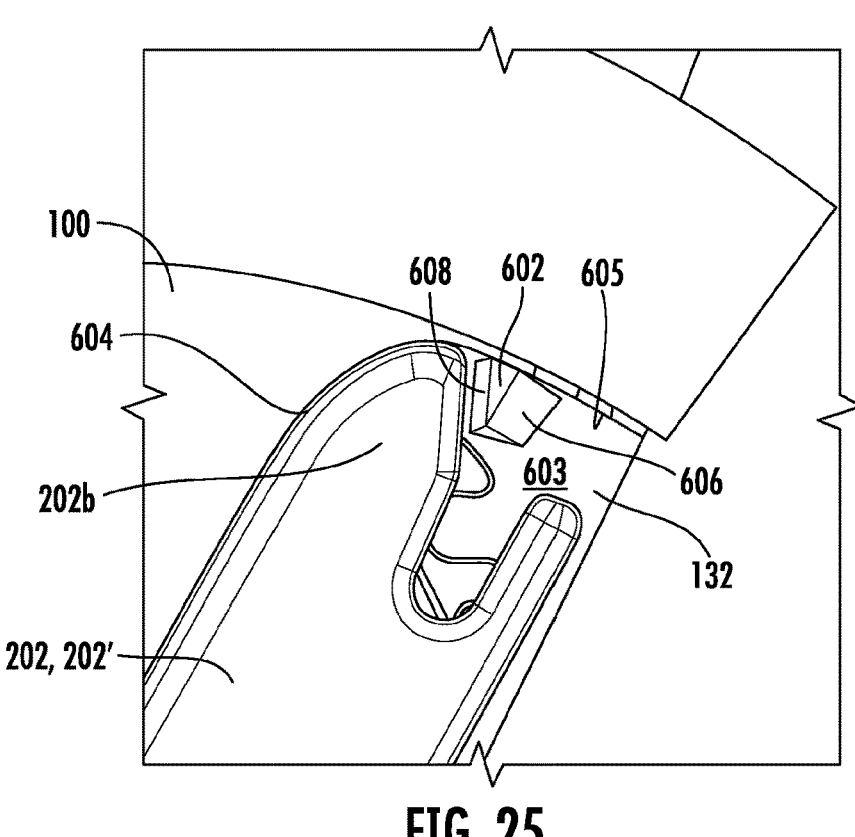
FIG. 25 shows a cross-sectional side view of a portion of the infant car seat in another embodiment, with a car seat anchor shown in a retracted position.

With specific reference now to FIG. 25, a first exemplary mechanism for retaining the car seat anchor 202, 202' in the retracted position is illustrated. Here, the car seat anchor 202, 202' is shown rotated up into the retracted position and held in a relatively static position via retaining member 602, which is in this case a protrusion. In the embodiment as shown in FIG. 25, the protrusion 602 is positioned in the pocket 132 at major surface 603 proximate the free end 202*b* of the anchor 202, 202', though it could be positioned anywhere along the length of surface 603, as well as at a surface 605 running relatively orthogonal to surface 603. The protrusion 602 here is rigid and acts to frictionally fit the anchor 202, 202' in a retained region 604 of the pocket 132. As shown, the protrusion 602 may have a first sloped surface 606 and a second sloped surface 608, with the slope of the first sloped surface 606 being gradual or less inclined relative to the second sloped surface 608, which includes a steeper incline (which perhaps could be as much as 90°). Via these respective slopes, the anchor 202, 202' may be rotated with limited frictional resistance over the first sloped surface

606 towards a fully retracted position in the retained region 604 of the pocket 132, while encountering greater resistance when being rotated back over the second sloped surface 608 towards the various extended positions. Indeed, when the anchor 202, 202' is rotated towards the retracted position and passes up and over the gradually sloped surface 606, a user should be able to relatively easily overcome the anchor's natural bias towards the surface 603 (as caused by the anchor's rigidity and attachment to the car seat shell 100). However, when rotated in the opposite direction towards the extended positions, more force will be required from the user to move the anchor 202, 202' up and over the steeper sloped surface 608. In such a manner the car seat anchor 200, 202' is retained or locked in the retracted position. Of course, configurations with different shapes than that shown in FIG. 25 are also contemplated herein. Configurations with similarly sloped surfaces on both sides of the protrusion 602, or even merely hemispherical bumps, would also suffice as retaining members 602 provided they inhibit movement of the anchor 202, 202' out of the retracted position. Disparity in slope and/or relative force needed to rotate towards and away from the retracted position is not required to be considered a retaining member as used herein. In addition, a protrusion as similarly discussed herein could also be positioned on the car seat anchor 202, 202' itself, with the anchor moving into a recessed area in the retained region 604 of the pocket 132, and the protrusion acting with a wall of the recess to frictionally retain the anchor 202, 202' in the retained position.

Figure 26:
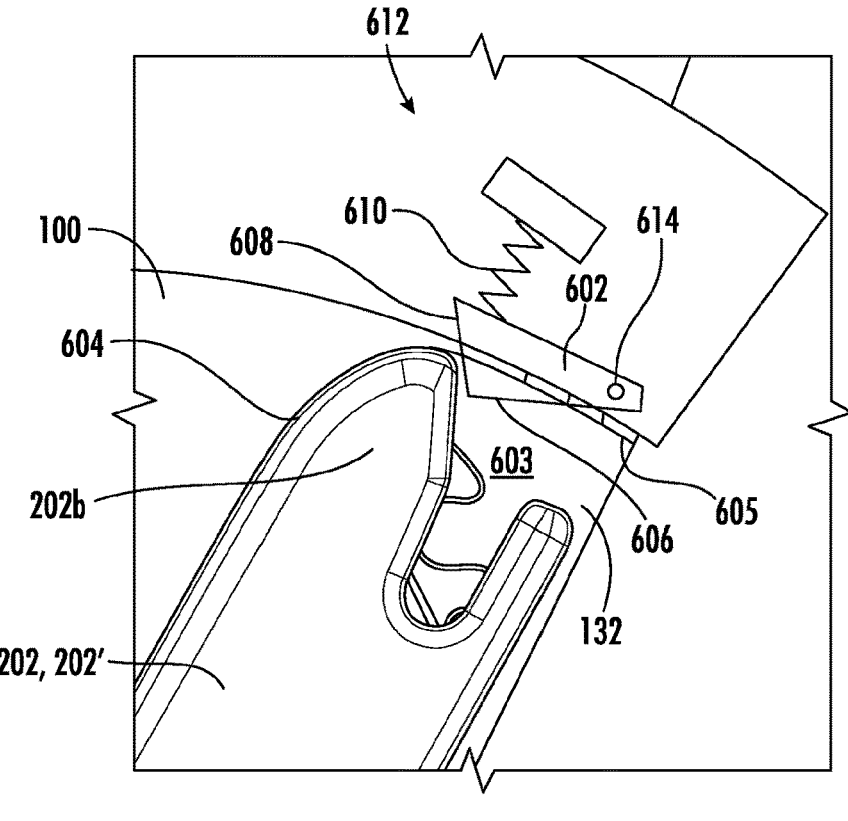
FIG. 26 shows a cross-sectional side view of a portion of the infant car seat in another embodiment, with a car seat anchor shown in a retracted position.
Figures 27, 28:
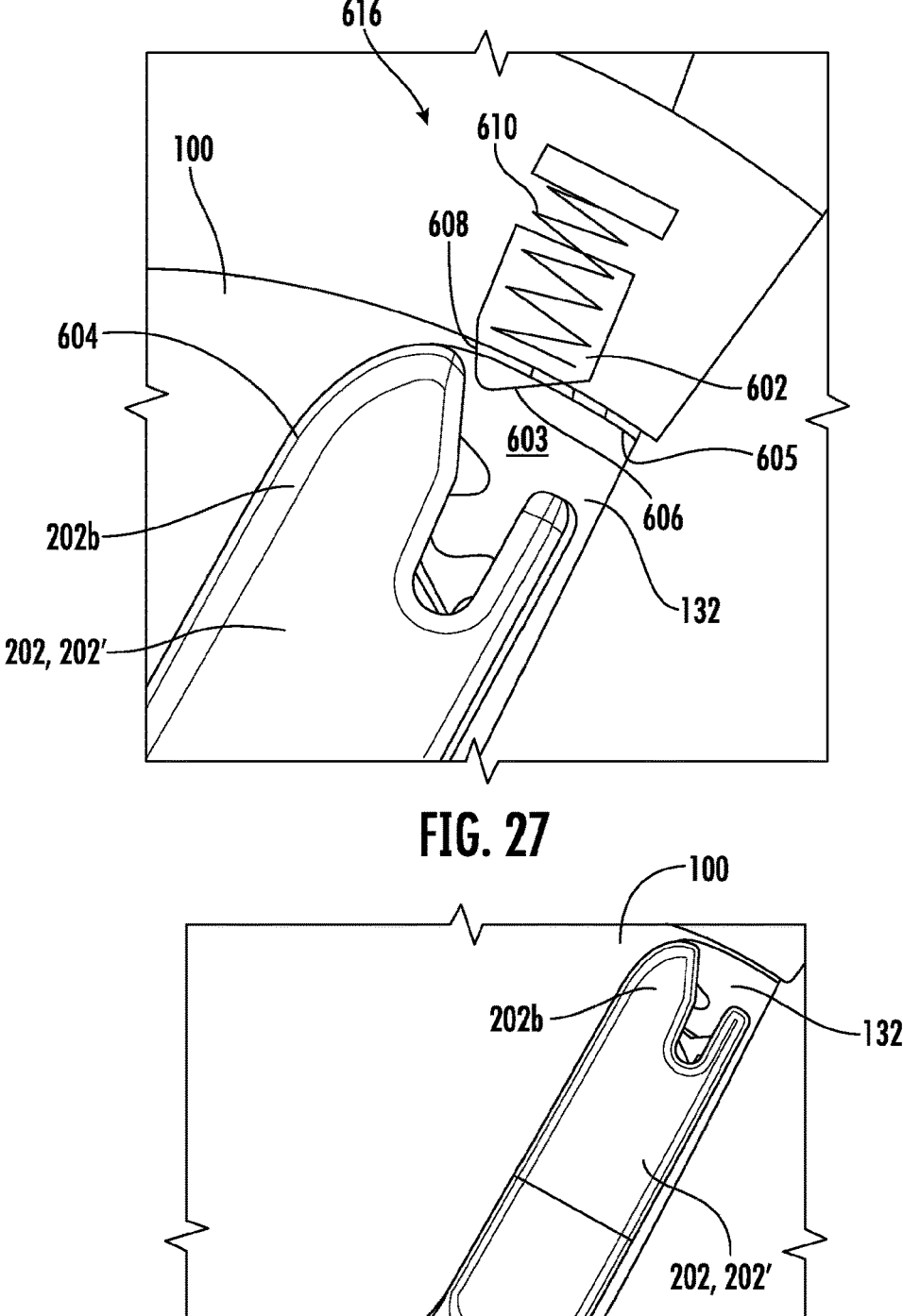
FIG. 27 shows a cross-sectional side view of a portion of the infant car seat in another embodiment, with a car seat anchor shown in a retracted position.
FIG. 28 shows a cross-sectional side view of a portion of the infant car seat in another embodiment, with a car seat anchor shown in a retracted position.

Turning now to FIGS. 26 and 27, further exemplary mechanisms for retaining the car seat anchor 202, 202' in the retracted position are illustrated. Here again, the car seat anchor 202, 202' is shown rotated up into the retracted position and held in a relatively static position via retaining member 602, which is in this case a depressible protrusion. In the embodiment as shown in FIGS. 26 and 27, the depressible protrusion 602 is positioned in the pocket 132 proximate the free end 202b of the anchor 202, 202' at the surface 605, though it could also be positioned anywhere along the length of surface 603 (and depressible therein). As the car seat anchor 202, 202' enters the pocket 132 and is rotated towards a fully retracted position it passes over and depresses the depressible protrusion 602. This depression is of course aided by the first sloped surface 606, which is again gradual relative to the second sloped surface 608. When the car seat anchor 202, 202' is moved past the first sloped surface 606, a biasing member 610 such as a spring or resilient material biases the depressible protrusion 602 back into an extended position in the cavity of the pocket 132, positioning the depressible protrusion to block the anchor's path back out towards extended anchor positions. A user may have to manually depress the depressible protrusion 602, or at least apply more force when moving the anchor 202, 202', in order to rotate the anchor 202, 202' past the protrusion 602 towards the extended positions. However, as noted above with reference to FIG. 25, any shape or configuration of the depressible protrusion 602 that inhibits movement of the anchor 202, 202' out of the retracted position is contemplated herein, whether a disparity in slope or required force are present or not. In this manner the car seat anchor 200, 202' is retained or locked in the retracted position.

Various biasing configurations could be used to bias the depressible protrusion 602. In one such configuration, the infant car seat includes a "pivot catch" 612 as shown in FIG. 26, which includes the depressible protrusion 602 and the biasing member 610. Here, the depressible protrusion 602 is pivotably fixed to the car seat body 100 at point 614, and the biasing member 610 is positioned to rotationally bias at least a portion of the depressible protrusion out though an opening of the car seat body 100 into the pocket 132. In another such configuration, the infant car seat includes a "plunger catch" 616 as shown in FIG. 27, which includes the depressible protrusion 602 and the biasing member 610. Here, the depressible protrusion 602 is again at least partially biased into the pocket 132 through an opening in the car seat body 100, with the bias occurring via an axial or linear force provided by the biasing member 610.

Figures 29A, 29B:
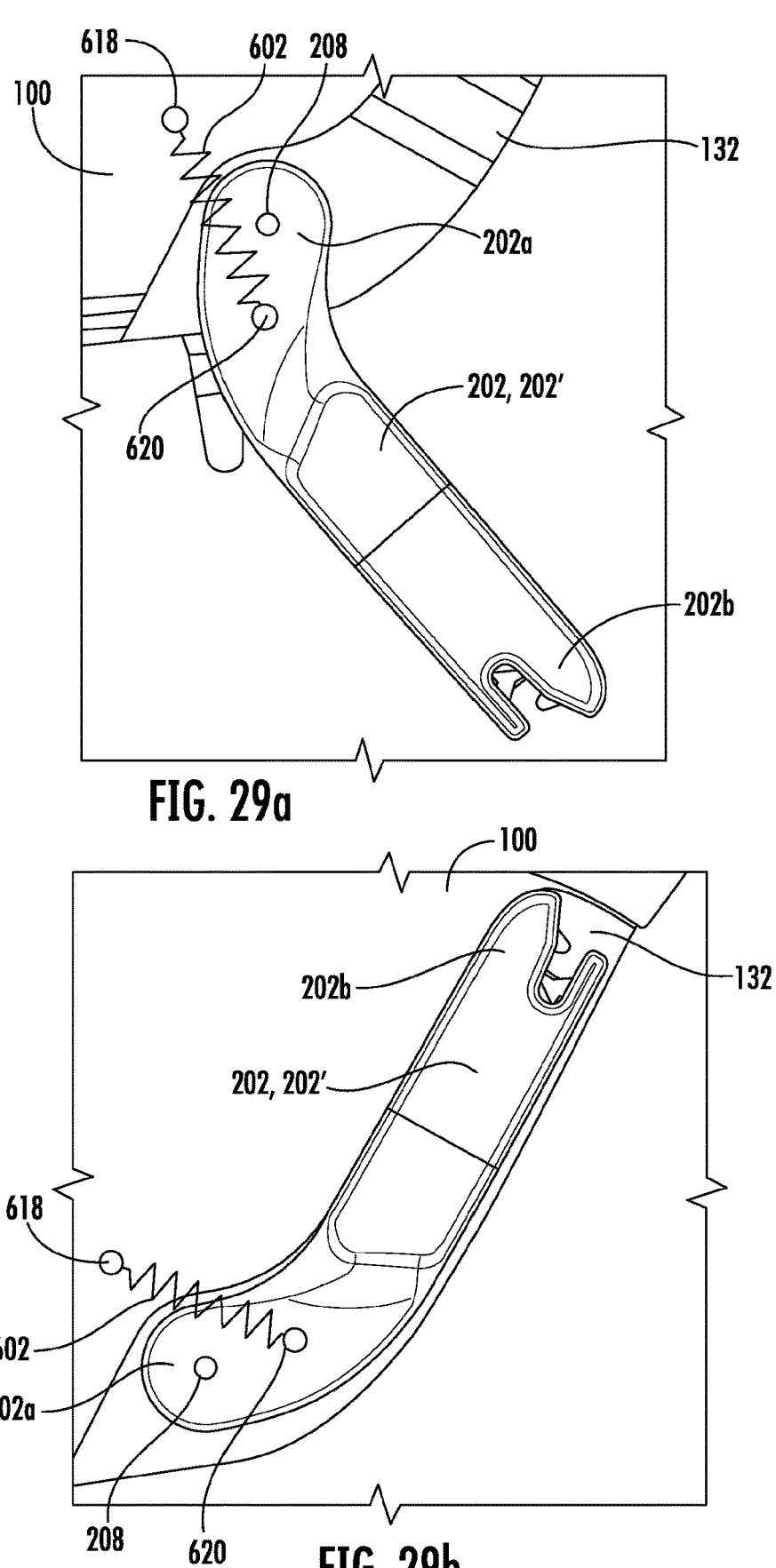
FIG. 29a shows a cross-sectional side view of a portion of the infant car seat in another embodiment, with a car seat anchor shown in an extended position.
FIG. 29b shows a cross-sectional side view of a portion of the infant car seat in another embodiment, with a car seat anchor shown in a retracted position.
Figures 30, 31:
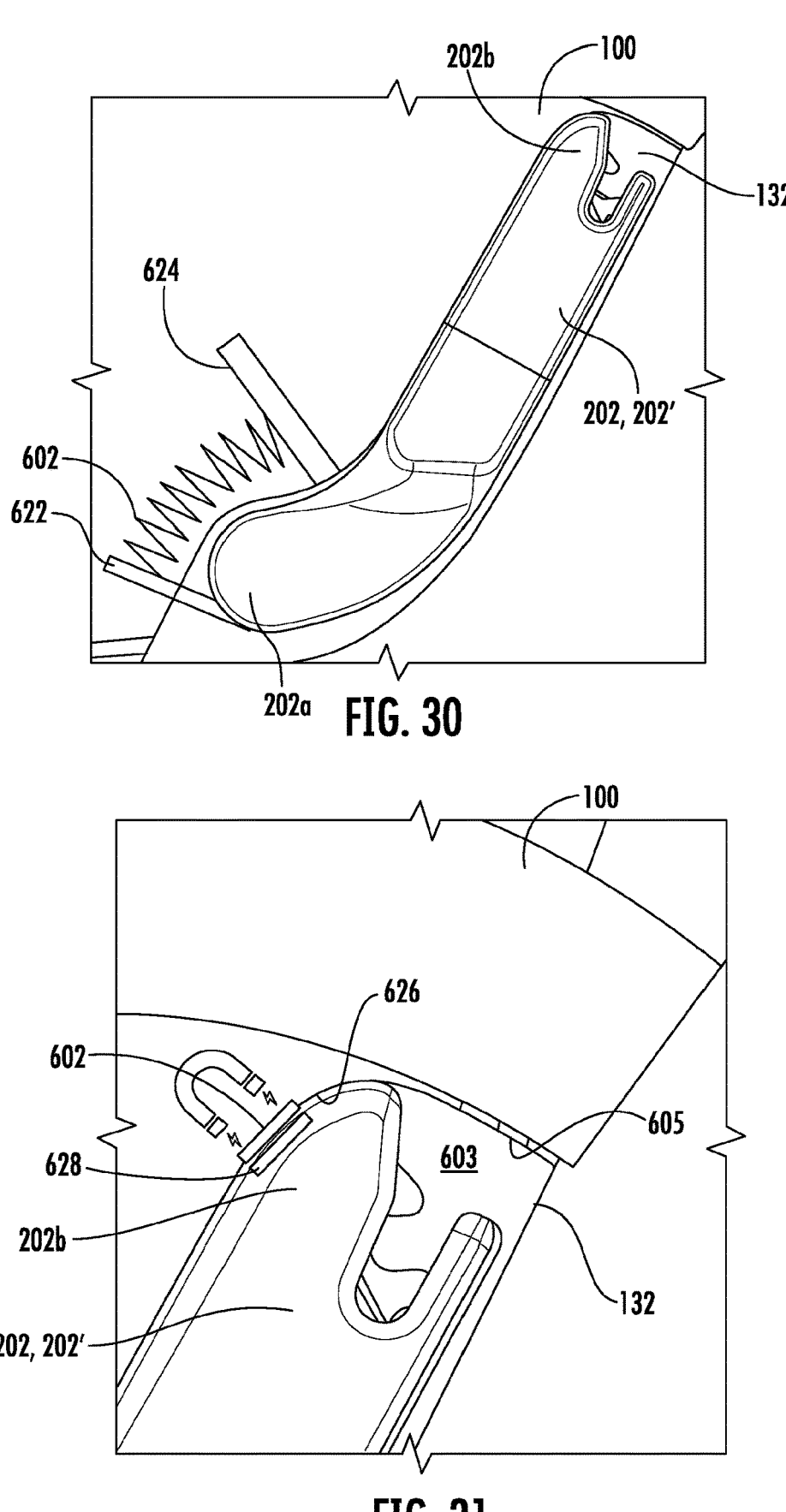
FIG. 30 shows a cross-sectional side view of a portion of the infant car seat in another embodiment, with a car seat anchor shown in a retracted position.
FIG. 31 shows a cross-sectional side view of a portion of the infant car seat in another embodiment, with a car seat anchor shown in a retracted position.

Referring now to FIGS. 28-30, the car seat anchor 202, 202' may be retainable in the retracted position via a consistent biasing force provided by a retaining member 602. In these exemplary embodiments the retaining members are biasing members such as springs or other resilient materials. As shown in FIG. 28, the retaining member may be a torsion spring 602 positioned proximate an end 202a of the anchor 202, 202' that is coupled to the shaft 208. In such an embodiment, the torsion spring 602 is affixed to both the car seat body 100 and anchor 202, 202' to rotationally bias the free end 202b of the anchor 202, 202' towards a retracted position. In order to rotate the car seat anchor 202, 202' towards extended positions, a user would have to overcome this bias. Via the rotational force created by the torsion spring 602, the retracted position of the anchor 202, 202' is also the resting position of the anchor 202, 202', and in this manner the anchor 202, 202' is retained in the retracted position.

Similarly, and as shown in FIGS. 29a, 29b, and 30, a tension spring or compression spring may be used as a retaining member 602 to rotationally bias the free end 202b of the anchor 202, 202' towards the retracted position. In the embodiment of FIGS. 29a and 29b, the tension spring 602 is affixed to the car seat body 100 at attachment point 618, and affixed to the anchor 203, 202' at attachment point 620. This configuration forms an "over-center" mechanism, whereby the anchor 202, 202' is rotationally biased towards the retracted position or the extended position depending on the rotation angle of the anchor 202, 202'. For example, starting in a fully extended position as shown in FIG. 29a, the tension spring 602 is shown positioned on a first side (i.e., below) the pivot axis 208 of the anchor 202, 202'. When positioned in this manner, the tension spring 602 exerts a pulling bias on the anchor 202, 202' that must be overcome by a user to move it out of the fully extended position. As a user rotates the anchor 202, 202' out of the fully extended position, the spring 602 extends and rotates with the anchor 202, 202'. When the spring 602 rotates to a point of reaching and passing the pivot axis 208 of the anchor 202, 202', the biasing force of the spring 602 essentially switches from pulling the anchor 202, 202' towards the fully extended position, to pulling the anchor 202, 202' towards the retracted position. Once in the fully retracted position as shown in FIG. 29b, a user has to overcome the biasing force of the tension spring 602 to move the anchor 202, 202' out of the retracted position. In this manner the anchor 202, 202' is retained in the retracted position. It should be noted that in order to move from one position to another across the pivot axis, an opening in the end 202a of the anchor 202, 202' may need to be present to allow for a clearance through which the spring can rotationally move. In addition, while this exemplary configuration includes a positioning of the attachment point 620 proximate anchor end 202a, affixing of the tension spring 602 anywhere along the length of the anchor 202, 202'(internally or externally thereto) is also contemplated herein.

As shown in FIG. 30, the compression spring 602 may be disposed between an anchor extension 622 and an internal car seat member 624 (such as a flange, shelf, or any other static component internal to the car seat body 100). The anchor extension 622 may be positioned to extend from an anchor area proximate the end 202_a_. Such a configuration creates a bias that rotates the free end 202_b_ of the anchor 202, 202' towards a retracted position, with a user being forced to overcome this bias in order to move the car seat anchor 202, 202' towards extended positions. Here again, in both the tension spring embodiment of FIGS. 29_a_ and 29_b_ and the compression spring embodiment of FIG. 30, the retracted position of the anchor 202, 202' is also the resting position of the anchor 202, 202', and in this manner the anchor 202, 202' is retained in the retracted position.

With reference now to FIG. 31, an additional exemplary embodiment for retaining the car seat anchor 202, 202' in the retracted position is illustrated. Yet again, the car seat anchor 202, 202' is shown rotated up into the retracted position and held in a relatively static position via retaining member 602, which is in this case a magnet. In the embodiment as shown in FIG. 30, the magnet 602 is positioned proximate the free end 202_b_ of the anchor 202, 202' at inner wall surface 626 of the pocket 132, though it could also be positioned at surface 605, anywhere along the length of surface 603, or at a surface of the anchor 202, 202' itself. If the magnet 602 is located at any surface of the pocket 132, a corresponding metallic body 628 may be positioned at a surface of the anchor 220, 221 to align with the magnet 602 when in the desired retracted position. Similarly, if the magnet 602 is located at a surface of the anchor 202, 202', the metallic body may be positioned a corresponding surface of the pocket 132. In order to rotate the car seat anchor 202, 202' out of the retracted position and towards extended positions, a user would have to overcome the force of the magnet 602. In this manner the car seat anchor 200, 202' is retained or locked in the retracted position.

It should be noted that the illustrations and descriptions of the examples and embodiments shown in the figures are for exemplary purposes only, and should not be construed limiting the disclosure. One skilled in the art will appreciate that the present disclosure contemplates various embodiments. Additionally, it should be understood that the concepts described above with the above-described examples and embodiments may be employed alone or in combination with any of the other examples and embodiments described above. It should further be appreciated that the various alternative examples and embodiments described above with respect to one illustrated embodiment can apply to all examples and embodiments as described herein, unless otherwise indicated.

Unless explicitly stated otherwise, each numerical value and range should be interpreted as being approximate as if the word "about," "approximately," or "substantially" preceded the value or range. The terms "about," "approximately," and "substantially" can be understood as describing a range that is within 15 percent of a specified value unless otherwise stated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. An infant car seat, comprising:

a car seat body that defines a seating surface for a child;

a first car seat anchor and a second car seat anchor, each being configured to releasably lock to an anchor of the vehicle seat, each being coupled to the car seat body, and each being configured to move relative to the car seat body between a retracted position and at least one extended position; and at least one foot coupled to the car seat body such that movement of one or both of the first and second car seat anchors between the retracted position and the at least one extended position causes the at least one foot to move relative to the car seat body, and causes one or both of the first and second car seat anchors to move between a stowed position and at least one deployed position, wherein the at least one foot is positioned to engage a seat pan of the vehicle seat in the at least one deployed position.

2. The infant car seat of claim 1, wherein the infant car seat is configured such that movement of one or both of the first and second car seat anchors causes a movement of the at least one foot that is different from a movement of one or both of the first and second car seat anchors.

3. The infant car seat of claim 1, wherein:

the car seat body defines a recess therein that extends into one or both of a lower end and a front end of the car seat body;

the at least one foot is configured to be received in the recess when the at least one foot is in the stowed position; and each of the first and second car seat anchors are disposed outwardly from the recess when the first and second car seat anchors are in the retracted position.

4. The infant car seat of claim 1, wherein the first and second car seat anchors are spaced from one another so as to define a space therebetween, and the at least one foot is configured to translate within the space relative to the first and second car seat anchors.

5. The infant car seat of claim 1, wherein the infant car seat is configured such that, when one or both of the first and second car seat anchors moves to a first one of the at least one extended position, the at least one foot moves a first distance, and when the one or both of the first and second car seat anchors moves from the first one of the at least one extended position to a second one of the at least one extended position, the at least one foot moves a second distance, less than the first distance, or does not move at all.

6. The infant car seat of claim 1, wherein the infant car seat is configured such that one or both of the first and second car seat anchors moves a first distance from a first position to a second position, thereby causing the at least one foot to move a second distance, less than the first distance.

7. The infant car seat of claim 1, wherein the at least one retractable foot is configured to rotate in a direction that is opposite from a direction in which at least one of the first and second car seat anchors rotate.

8. The infant car seat of claim 1, further including at least one shaft that couples one or both of the first and the second car seat anchors to the car seat body; and a pair of gears having a driver gear rotationally fixed to the at least one shaft; and a driven gear that engages the driver gear and that is rotationally fixed to the at least one foot, wherein movement of one or both of the first and second car seat anchors between the retracted and extended positions causes the driver gear to drive the driven gear so as to move the at least one foot between the stowed position and the at least one deployed position.

9. The infant car seat of claim 8, wherein the driven gear has a larger diameter than the driver gear.

\* \* \* \* \*